United States Patent
Lassley et al.

(10) Patent No.: US 9,195,719 B2
(45) Date of Patent: Nov. 24, 2015

(54) WATER RIGHTS ANALYSIS SYSTEM

(71) Applicant: Pinnacle Software, LLC, Salt Lake City, UT (US)

(72) Inventors: Jesse R. Lassley, Cottonwood Heights, UT (US); Collin J. Green, Herriman, UT (US)

(73) Assignee: Pinnacle Software, LLC, Salt Lake City, UT (US)

( * ) Notice: Subject to any disclaimer, the term of this patent is extended or adjusted under 35 U.S.C. 154(b) by 246 days.

(21) Appl. No.: 13/772,996

(22) Filed: Feb. 21, 2013

(65) Prior Publication Data

US 2013/0218873 A1 Aug. 22, 2013

Related U.S. Application Data

(60) Provisional application No. 61/601,503, filed on Feb. 21, 2012, provisional application No. 61/663,380, filed on Jun. 22, 2012, provisional application No. 61/699,791, filed on Sep. 11, 2012.

(51) Int. Cl.
| | |
|---|---|
| *G06F 7/00* | (2006.01) |
| *G06F 17/30* | (2006.01) |
| *G06Q 10/10* | (2012.01) |
| *G06Q 30/02* | (2012.01) |
| *G06Q 50/06* | (2012.01) |

(52) U.S. Cl.
CPC .... *G06F 17/30554* (2013.01); *G06F 17/30241* (2013.01); *G06Q 10/101* (2013.01); *G06Q 30/02* (2013.01); *G06Q 50/06* (2013.01)

(58) Field of Classification Search
None
See application file for complete search history.

(56) References Cited

U.S. PATENT DOCUMENTS

| | | | |
|---|---|---|---|
| 7,103,479 B2 | 9/2006 | Patwardhan et al. | |
| 7,283,909 B1 | 10/2007 | Olsen et al. | |
| 7,672,892 B2 | 3/2010 | Odom et al. | |
| 7,805,380 B1 * | 9/2010 | Hornbeck et al. | 705/315 |
| 7,865,416 B1 | 1/2011 | Graff et al. | |
| 8,024,239 B2 | 9/2011 | Shirazi | |
| 8,131,650 B2 | 3/2012 | Reardon et al. | |
| 8,341,090 B1 * | 12/2012 | Hornbeck et al. | 705/315 |
| 2003/0014342 A1 | 1/2003 | Vande Pol | |
| 2008/0120255 A1 | 5/2008 | Adams | |

(Continued)

OTHER PUBLICATIONS

"Water Right Information," Utah Division of Water Rights, www.waterrights.utah.gov, as accessed on Jan. 23, 2012 by Internet Archive, web.archive.org/web/20120123163251/http://www.waterrights.utah.gov/wrinfo/default.asp (accessed Mar. 16, 2015).

(Continued)

*Primary Examiner* — Robert Beausoliel, Jr.
*Assistant Examiner* — Michael Pham
(74) *Attorney, Agent, or Firm* — ALG Intellectual Property, LLC

(57) ABSTRACT

Exemplary water rights analysis systems and methods are disclosed herein. An exemplary method includes obtaining water rights data from a water rights agency database, maintaining a database of water rights data, receiving from a user a search query for water rights data, and presenting the search results on the user device. The exemplary method may additionally or alternatively include displaying on the user device one or more graphical elements on a geo-reference base layer representing one or more water rights data elements, such as a point of diversion change. Corresponding methods and systems are also disclosed.

25 Claims, 17 Drawing Sheets

(56) References Cited

U.S. PATENT DOCUMENTS

2008/0306879 A1 12/2008 Legatz
2009/0055294 A1 2/2009 Shirazi

OTHER PUBLICATIONS

"Searching Water Right Records," Utah Division of Water Rights, www.waterrights.utah.gov/wrinfo/query.asp (Mar. 26, 2004), as accessed on Jan. 23, 2012 by Internet Archive, web.archive.org/web/20120123163257/http://www.waterrights.utah.gov/wrinfo/query.asp (accessed Mar. 16, 2015).

"WRPLAT Point of Diversion Query Program," Utah Division of Water Rights, utstnrwrt6.waterrights.utah.gov/cgibin/wrplat.exe?Startup (Mar. 26, 2004), as accessed on Oct. 9, 2004 by Internet Archive, web.archive.org/web/20041009231934/http://utstnrwrt6.waterrights.utah.gov/cgibin/wrplat.exe?Startup (accessed Mar. 16, 2015).

"Water Right Notifications," Utah Division of Water Rights, www.waterrights.utah.gov (Jul. 14, 2005), as accessed on Jan. 23, 2012 by Internet Archive, web.archive.org/web/20120123163258/http://www.waterrights.utah.gov/wrinfo/notices.asp (accessed Mar. 17, 2015).

"Water Right Action Notification Program," waterrights.utah.gov/cblapps/concernedcitizen.exe?Startup=NOW (Jul. 14, 2005), as accessed on Sep. 2, 2011 by Internet Archive, web.archive.org/web/20110902002243/http://waterrights.utah.gov/cblapps/concernedcitizen.exe?Startup=NOW (Jul. 14, 2005), as accessed on Sep. 2, 2011 by Internet Archive, web.archive.org/web/20110902002243/http://waterrights.utah.gov/cblapps/concernedcitizen.exe?Startup=NOW (accessed on Mar. 17, 2015).

"Advertising List by County," www.waterrights.utah.gov/forms/advertListByCounty.asp?Startup=Now, as accessed on Oct. 3, 2011 by Internet Archive, https://web.archive.org/web/20111003071341/http://www.waterrights.utah.gov/forms/advertListByCounty.asp?Startup=Now (accessed on Mar. 17, 2015).

\* cited by examiner

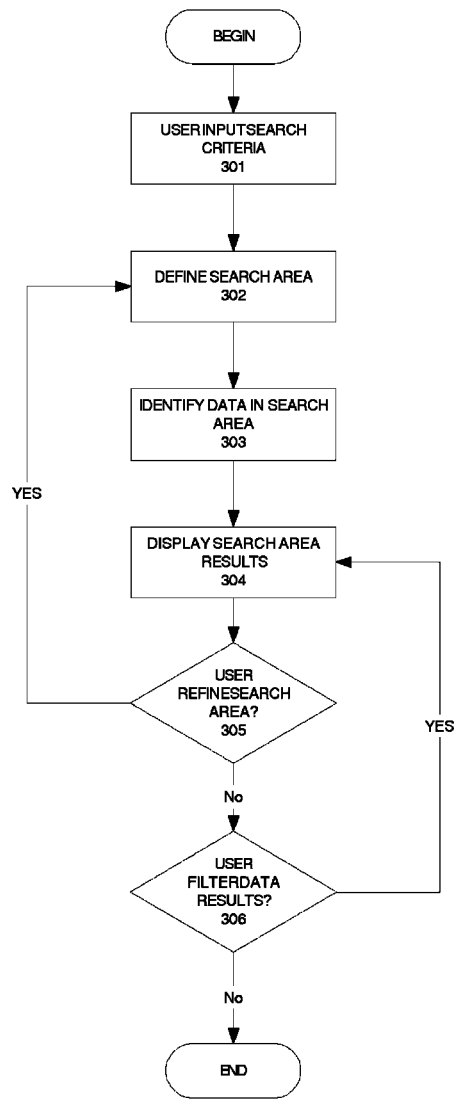

WATER RIGHTS ANALYSIS SYSTEM

RELATED APPLICATIONS

This application claims priority under 35 U.S.C. §119(e) to U.S. Provisional Patent Application No. 61/601,503 filed Feb. 21, 2012, U.S. Provisional Patent Application No. 61/663,380 filed Jun. 22, 2012, and U.S. Provisional Patent Application No. 61/699,791 filed Sep. 11, 2012, the contents of which are incorporated herein by reference in their entireties.

BACKGROUND

Water is one of the most important and vital natural resources. It is the very life-blood of a sustainable society. In the United States, the ownership and use of water is governed by law, usually state law. There are two general legal systems for the regulation of water. In the eastern United States, water is regulated by riparian water rights. In the western United States, where the climate is often arid and water is more scarce, water is regulated by the prior appropriation doctrine. Under the prior appropriation doctrine, all naturally-occurring waters are deemed to be owned by the public as a whole, but regulated by the states as trustees for the public. The states administer the regulation of water through state regulatory agencies, usually headed by an official often called the "state engineer." All water not already appropriated, i.e., not being used, is available for appropriation and use by any person for a beneficial purpose. Because water is owned by the public, one who desires to appropriate water to put it to a beneficial use (referred to as an "appropriator") does not "own" the water, but obtains only a right to use the water. The appropriator therefore only owns a "water right."

A water rights agency maintains the records and information associated with each water right, usually with a separate file for each water right. The paper records within a water right file are available for review and inspection by members of the public at the office of the water rights agency. In addition, most water rights agencies maintain electronic copies of water rights records, such as in a computer database, which allows the water rights agencies as well as the public to electronically search for and retrieve water rights records and information. Some of these databases and water rights records are available to the public via the Internet.

However, water rights agencies' electronic repositories and databases have only limited usability for robust water rights searches and analyses. For example, a water right file or information can be obtained only by entering the assigned water right number or the name of the water right's owner for a specific water right. This requires that the searcher have a specific water right to search for and know specific identifying information about the water right. In addition, the information obtained from a water rights agency database in a water right search is limited to the single, specific water right searched. The information provided by a water rights agency database is limited, and relevant water rights information is often difficult to locate. Accordingly, there exists a need for an improved water rights analysis tool.

BRIEF DESCRIPTION OF THE DRAWINGS

The novel system, methods, and products described herein can be understood in light of FIGS. 1-10, in which:

FIG. 3 depicts an exemplary embodiment of a high-level flowchart of a water rights analysis method.

Figure 1A:
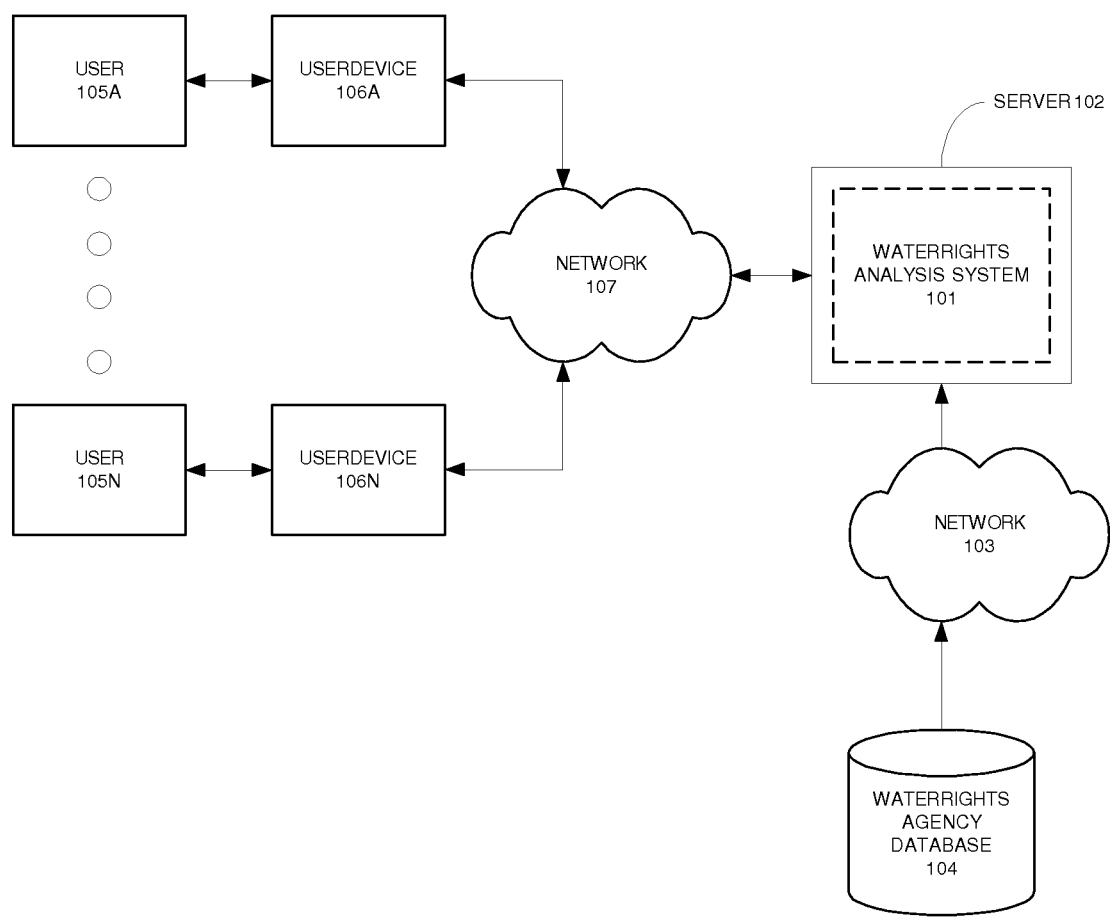
FIGS. 1A and 1B depict exemplary embodiments of the water rights analysis system and network.

Together, the Figures illustrate specific aspects of the novel system, methods, and products described herein and constitute a part of the specification. Together with the following description, the Figures demonstrate and explain principles of the system, methods, and products.

DETAILED DESCRIPTION

The following detailed description includes specific details in order to provide a thorough understanding of the novel water rights analysis system and method. Reference is made to the accompanying drawings which form a part hereof, and in which is shown by way of illustration specific embodiments in which a water rights analysis tool may be implemented. These embodiments are described in sufficient detail to enable those skilled in the art to implement and/or practice the novel water rights analysis system and methods, and it is to be understood that other embodiments may be utilized and that structural, logical, and other changes may be made without departing from the spirit and scope of the teachings herein. The following detailed description is, therefore, not to be taken in a limiting sense.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

The various jurisdictions that administer water rights do so through regulatory agencies and entities ("water rights agencies") according to their own laws, regulations, and procedures, but the methods of administering water rights in all jurisdictions are similar. Water rights agencies include any federal, Indian tribe, state, or local government entity or body that regulates or administers water rights, including but not limited to state executive agencies (often headed by an official titled a "state engineer"), as well as courts and other judicial tribunals. Examples of water rights agencies include, but are not limited to, the Utah Division of Water Rights, California Division of Water Rights (State Water Resources Control Board), State of Washington Department of Ecology, Oregon Water Resources Department, Idaho Department of Water Resources, Arizona Department of Water Resources, New Mexico Office of the State Engineer, Colorado Division of Water Resources, Wyoming State Engineer's Office, Montana Water Rights Bureau, North Dakota State Water Commission, South Dakota Division of Environmental Services (Water Rights Program), Nebraska Department of Natural Resources, Kansas Division of Water Resources (Department of Agriculture), Oklahoma Water Resources Board, Texas Commission on Environmental Quality, Alaska Division of Mining, Land, and (Water Department of Natural Resources), Nevada Water Resources Division, and any of their related agencies. However, a water rights agency may be any government agency or entity that administers water rights.

New water rights may be created by several different methods, each of which is defined more specifically in the relevant jurisdiction's water laws. By way of example, in one method new water rights are created by filing an application with a water rights agency to appropriate water. If approved by the water rights agency, the applicant may then begin the process of putting the water to use, such as by drilling a well or installing a diversion dam in a stream. Once the water has been put to use, the water right applicant/owner may then perfect the water right by obtaining a certificate or license from the water rights agency. Regardless of how a water right is created, a water right, whether perfected or unperfected, gives the water right owner the right to use water only as approved by the water rights agency. The following parameters of a water right may be specified and limited by the water rights agency: (i) the quantity of water approved for use, defined in volume or flow rate; (ii) the approved purposes for which the water can be used (the "nature of use"); (iii) the approved point(s) of diversion ("POD") where the water can be diverted or withdrawn from the natural hydrologic system, such as from a stream or a groundwater well; (iv) the approved places of use for the water ("POU"); and (v) the periods during the year when the water can be used. In addition, water rights agencies assign a water right a priority date, often based on when the water was first beneficially used or first appropriated. In times of shortage, the water rights with the highest (oldest) priority will be the first to receive water, while those with later priorities will be the first to have the diversion or use of water curtailed.

A standard unit of volume for a water right is the acre-foot, which is the volume of water that covers one acre of land one foot deep. One acre-foot of water is approximately 325,851 gallons. A standard unit of flow rate is second-feet, or cubic feet per second (cfs). Approved natures of use of water often include, but are not limited to, uses such as domestic, agricultural, irrigation, industrial, manufacturing, mining, municipal, stockwatering, storage, power production, and instream flows (e.g. fish habitat).

Water rights are not static. The approved nature of use, PODs, POUs, and period of use for a water right (the "heretofore" parameters) can be changed or transferred to new locations, new periods of use, and/or new purposes of use (the "hereafter" parameters). To make such a change, the water right owner must often file an application with the water rights agency (referred to herein as a "change application"). The water rights agency considers the merits of the change application, and then approves or rejects the change application. Once a change application has been approved by the water rights agency, the water right owner may then begin to make the change, such as by developing a new point of diversion, applying the water to a new place of use, or using the water for a different purpose. Once the change has been completed and the water put to beneficial use in accordance with the change, the water right owner may then perfect the change by obtaining a license or certificate from the water rights agency. For example, if a water right owner desires to move the approved POD from a point on a stream to an underground water well, the water right owner must file a change application with the water rights agency, showing the stream diversion as the heretofore POD and the proposed well location as the hereafter POD. If the water rights agency approves the change application, the water right owner may then begin drilling the well. When the well is complete and has produced water, the water right owner may then perfect the POD change by obtaining a certificate for the change from the water rights agency.

Another type of water right is a water right exchange. A water right exchange involves the release of water into a stream, reservoir or other body of water in exchange for a like quantity of water withdrawn at another point. For example, a person may divert water from a groundwater well in exchange for releasing the same quantity of water, such as from a reservoir, into a river upstream from the groundwater well. Such an exchange is accomplished by first filing an exchange application with the water rights agency. Once the exchange application is approved, the applicant may then begin to make the exchange and put the water to use in accordance with the approval of exchange application.

As used herein, "water rights" refers to all water rights administered by a water rights agency, whether perfected or unperfected, and whether created or arising by a court decree or order, a certificate issued by the water rights agency, a claim filed with a water rights agency or a court, an approved application to appropriate, an approved change application, a water right segregation, and/or an approved exchange application, or any other method under the law of the jurisdiction for creating a water right. It should be appreciated that each jurisdiction may have its own terminology with respect to water right rights regulation and administration, and that the terms used herein are not intended to be limiting but only representative of the nature and type of water right and associated water right data among all jurisdictions.

The water rights system, methods, and products described herein provide a unique and powerful tool for accessing large amounts of water rights information and conveying it in a format that allows performance of much more detailed, robust, and accurate analyses of water rights information and trends than possible with conventional tools.

FIG. 1A shows the components of a water rights analysis system 101 and associated network. The water rights analysis system 101 is located on a server 102 and is connected to a water rights agency database 104 via a network 103. The server 102 receives water rights data from the water rights agency database 104 via the network 103. The server 102 stores the received water rights data in one or more databases (not shown) housed on the server 102. The server 102 receives a search query from a user 105A via a user device 106A transmitted to the server 102 via a network 107. Based on the search query from user 105A, the water rights analysis system 101 on the server 102 retrieves the relevant water rights data called for by the user's search query and returns the search results to the user device 106A.

The server 102 may comprise one or more servers, computers, processors, or other devices capable of storing or executing the water rights analysis system 101 and software to perform the methods described herein. The user device 106A is any type of electronic computing device that allows the user 105A to electronically connect with the water rights analysis system 101 via a network (e.g., network 107) and receive or display visual or graphical results. The user device 106A includes, but is not limited to, a computer, laptop, tablet, mobile phone, smartphone, personal digital assistant, gaming console, Internet television, and the like. Indeed, the user device 106A may include any type of computer processor configured to communicate via a network with the water rights analysis system 101 and display results visually or graphically, either on the user device 106A or on another visual display device connected to the user device 106A, such as a monitor or touch-screen. Any number of users 105A . . . 105N and user devices 106A . . . 106N may communicate with the server 102 and run queries on the water rights analysis system 101 at any given time.

The networks 103 and 107 may include any type of electronic network, including, but not limited to, the Internet, a local area network, wireless area network, VPN, satellite network, fiber optic network, and the like. The connection to the networks 103 and 107 may be accomplished via a network interface device (not shown), which may comprise, for example, a telephone modem, a cable modem, a DSL line, a satellite, a cellular network, a router, gateway, hub, and the like.

The water rights agency database 104 contains water rights data regarding the water rights administered by the water rights agency, including, but not limited to, water rights data representative of each water right's reference number, owner(s), POD(s), POU(s), quantity of use, nature of use, period of use, priority date, storage rights, status, and all associated change applications and exchange applications, and any other applications or information associated with the water right (e.g. extensions of time, non-use applications, segregation applications, etc.). The status of a water right is typically classified by the water rights agency as approved, rejected, withdrawn, lapsed, or certificated (i.e. perfected). The water rights data may also include water rights data representative of the basis for the water right, such as a court order or decree, application to appropriate, change application, exchange application, water right segregation, claim, or otherwise. For all change applications, the water rights data may include the "heretofore" and "hereafter" parameters of the water right, including but not limited to the PODs, POUs, quantity of use, nature of use, period of use, priority date, and storage rights. There are also other application types that have similar, relevant data, such as but not limited to, non-use applications, applications to extend the time for filing proof or perfection applications, water reuse applications, and segregation applications. In addition, the water rights data may include hydrologic basins and their boundaries, water rights agency policies, and groundwater management plans. In sum, water right data is any data and/or information stored in the water rights agency database 104 pertaining to water rights.

Figure 1B:
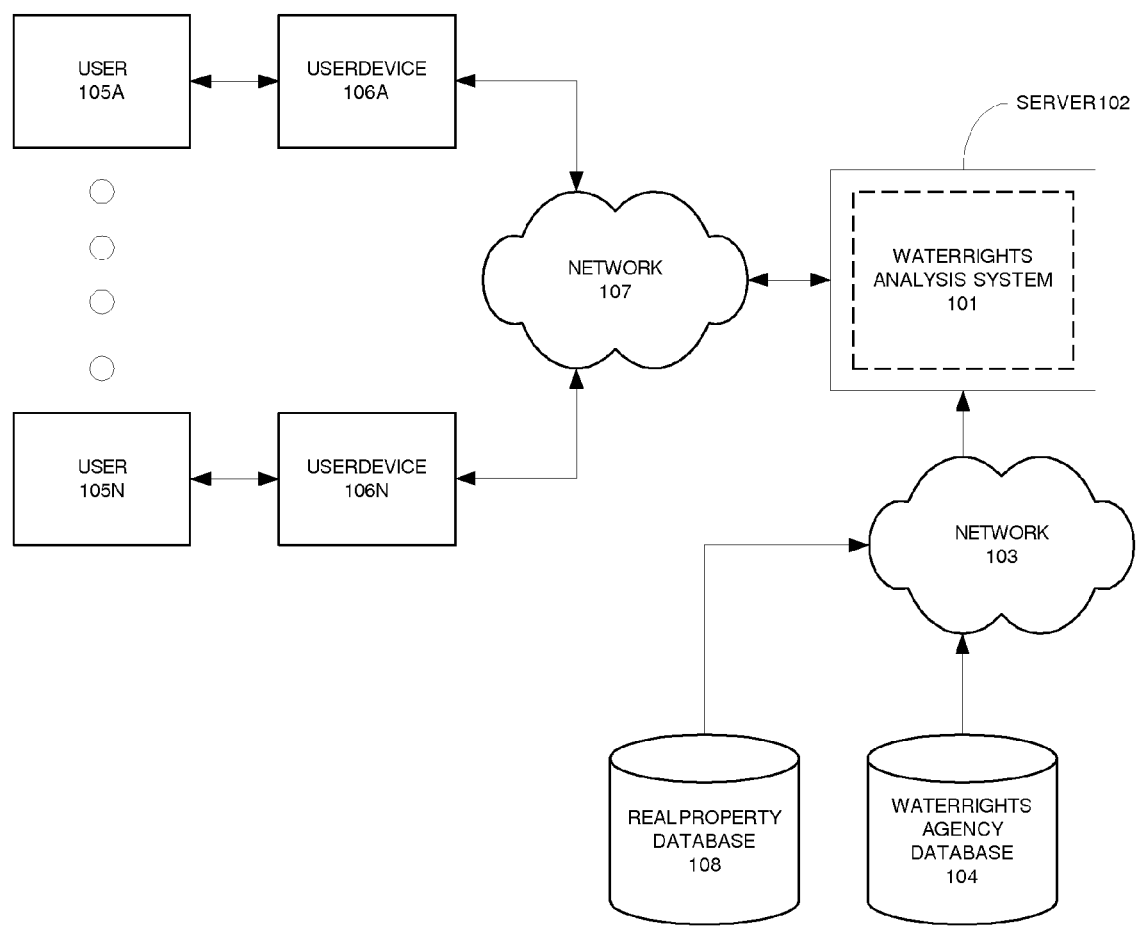

As shown in FIG. 1B, the system may also optionally be communicatively coupled to a real property database 108 containing real property data, i.e. data regarding real property parcels. The real property database 108 may be one or more databases containing geo-referenced parcel boundary line data, such as a database of real property parcels maintained or administered by a state tax commission, county assessor, or county recorder. The property data stored in the real property database 108 may also include data for each parcel such as the parcel number, owner name and contact address, parcel address, and legal description. In this embodiment, the water rights analysis system 101 receives real property data from the real property database 108 and stores it in the water rights analysis system 101.

In another embodiment (not shown), the water rights analysis system 101 is stored on computer media readable by removable disk drive or stored in solid state memory, volatile or otherwise (not shown) in communication with the processor in the user device 106A. For example, the water rights analysis system 101 may be installed on the user device 106A hard drive, or may be software accessed from a CD-ROM or other removable storage media. In this embodiment, all water rights data and property data is previously obtained from a water rights agency database 104 and real property database 108 and stored in the water rights analysis system 101 databases, and may be updated periodically. Such variations are all within the knowledge of one skilled in the art and, thus, will not be further elaborated on herein.

Figure 2:
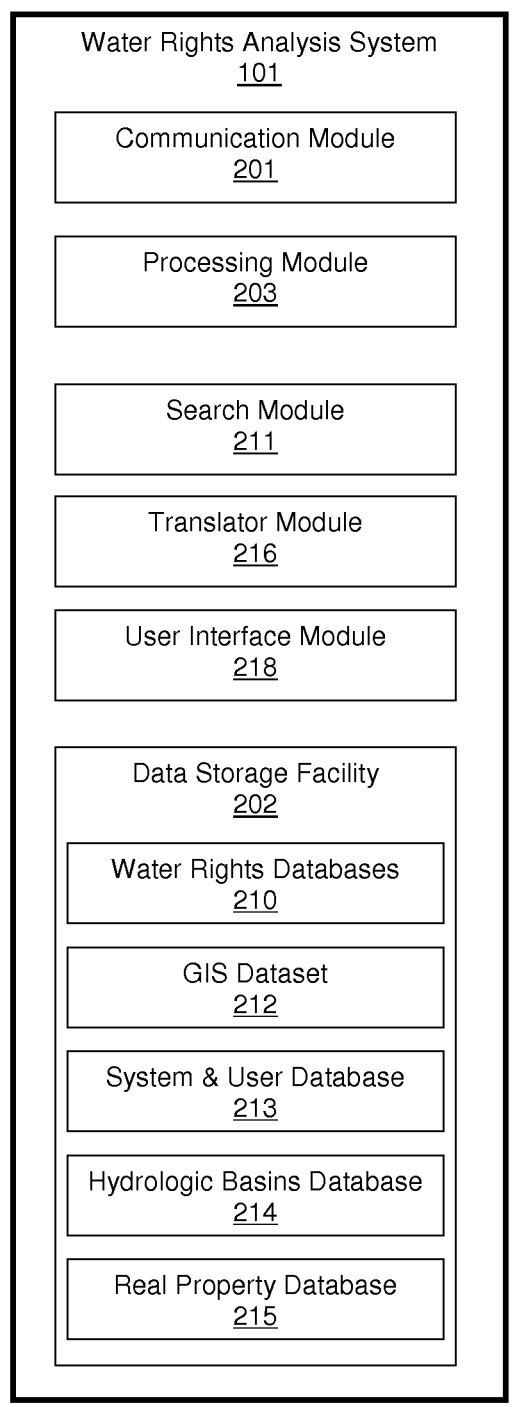
FIG. 2 depicts an exemplary embodiment of the water rights analysis system.

Referring now to FIG. 2, components of the water rights analysis system 101 are shown in more detail. As shown, the water rights analysis system 101 may include a communication module 201, processing module 203, search module 211, translator module 216, user interface module 218, and data storage facility 202. The components of system 101 may communicate with one another, including sending data to and receiving data from one another via communication infrastructure, using any suitable communication technologies.

Communication module 201 may be configured to facilitate communication between system 101 and user devices 106N, water rights agency databases 104, and real property databases 108. In particular, communication module 201 may be configured to transmit and/or receive communication signals and/or data to/from user devices 106N, water rights agency databases 104, and real property databases 108. Examples of communication module 201 may include, without limitation, a wired network interface (such as a network interface card), a wireless network interface (such as a wireless network interface card), a modem, and any other suitable interface.

Processing module 203 may include one or more hardware processors and may be configured to execute and/or direct execution of one or more of the water right analysis system processes or operations described herein. Processing module 203 may direct execution of operations in accordance with computer-executable instructions such as may be stored in storage facility 202 or another computer-readable medium.

User interface module 218 may be configured to provide one or more user interfaces configured to facilitate user interaction with system 101. For example, user interface module 218 may provide a user interface through which one or more functions, options, features, and/or tools may be provided to a user and through which user input may be received. In certain embodiments, user interface module 218 may be configured to direct a user device to display one or more web pages and/or any other content as may serve a particular implementation.

The water rights analysis system 101 also includes a search module 211 for receiving and processing a user's search query. The search module 211 is configured to receive a search query from a user device, to communicate with the system databases, and to return to the user device the results of the user's search query.

Data storage facility 202 may include one or more data storage media, devices, and/or configurations and may employ any type, form, and combination of data storage media and/or device. For example, data storage facility 202 may include, but is not limited to, a hard drive, network drive, flash drive, magnetic disc, optical disc, random access memory ("RAM"), dynamic RAM ("DRAM"), other non-volatile and/or volatile data storage units, holographic storage medium, or a combination or sub-combination thereof. Electronic data, including data described herein, may be temporarily and/or permanently stored in data storage facility 202.

In some examples, data may be arranged in one or more databases residing within storage facility 202. For example, data storage facility 202 may include one or more water rights databases 210 for storing water rights data received from one or more water rights agency databases 104. The search module 211 is configured to receive a search query from a user device 106A and run the process described below to identify the relevant water rights data in the water rights databases 210 and return the search results to the user device via a user interface. The data storage facility 202 may also include a geographic information system (GIS) reference dataset 212 that correlates to geo-referenced water rights data and comprises a base layer of the search results output to the user device. Data regarding the users' use of the system 101 may be maintained in a separate system and user database 213 for system data and user accounts.

In one embodiment, the data storage facility 202 may also include a hydrologic basins database 214 containing hydrologic basins data. In another embodiment, the data storage facility 202 also includes a real property database 215 containing real property data obtained from an external real property database (e.g., real property database 108).

The water rights databases 210 generally comprise one or more tables or relational databases for water rights data, but may be any type of database known to those of skill in the art capable of implementation in the present system and methods. In one embodiment, the water rights data is stored in the system databases 210 in the same form and type of databases as the data is stored in the water rights agency databases 204. In this embodiment, the system databases 210 may be a copy of the water rights agency databases 204. The system databases 210 may include all of the water rights data included in the regulatory agency database 204. For example, in one embodiment, the water rights databases for Utah comprise separate tables for water rights, owners, change applications, heretofore PODs, heretofore and hereafter nature of use, and correlations among the tables, such as which water rights are evidenced by which changes.

The water rights analysis system 101 may also include one or more GIS datasets 212 for visually displaying as the search results the geo-referenced water rights data, hydrologic basins data, and any other data stored in the system's databases. In one embodiment, the GIS dataset 212 comprises a geo-reference base layer such as a map or ortho-rectified satellite or aerial image. Any type of map may be used as the geo-reference base layer, including a street map, political boundaries map, topographical map, U.S. Geological Survey (USGS) maps, surveys, and the like. The GIS dataset 212 may be based on a geographic coordinate system or a projected coordinate system. The GIS dataset 212 is capable of presenting any geographically referenced data on the geo-reference base layer, and is characterized by either raster datasets or vector datasets. In one embodiment, the GIS dataset 212 is derived from any free, open source, or commercially available GIS web-mapping or imaging application, API or software development kit, such as, but not limited to, Google Maps, GoogleEarth, and OpenLayers. Geo-referenced data stored in the water rights databases 210, hydrologic basins databases 214, real property databases 215, and any other geo-referenced data is correlated with the GIS dataset 212 so that it may be displayed on the geo-reference base image layer in the search results. The GIS dataset 212 may also include other datasets besides the geo-reference base layer, including but not limited to datasets for features (points, lines, polygons), attributes, and continuous surfaces.

The water rights analysis system 101 may also include a system database 213 for storing system and user data about the water rights analysis system 101 and its users. Such system and user data includes, but is not limited to, a table of registered users, user account settings, user profiles, user billing data, user reports, user search histories, user logins, bandwidth usage, customer service requests, error messages, and the like. Indeed, any type of information about the water rights analysis system 101 and its users may be included in the system database 213.

The hydrologic basins databases 214 may contain all hydrologic basins data. Many water rights agencies geographically divide their jurisdiction according to hydrologic basins and regulate and administer water rights according to the hydrologic basins in which the water rights are located. Hydrologic basins data received from the water rights agency databases 104 generally comprise the geo-referenced location vector data that define hydrologic basins as polygons. Hydrologic basins data may also include any other data associated by the water rights agency databases 104 with the hydrologic basins, such as basin names or identifiers, and correlations to the hydrologic basins data. The hydrologic basins data is geographically referenced to the GIS dataset 212 so that the hydrologic basins may be displayed on the base map layer, such as by showing the basin boundaries or shading or cross-hatching the basin areas.

In another embodiment (not shown), the water rights analysis system 101 includes a database of water rights agency administrative policies. Often, a water rights agency will issue or promulgate policies or groundwater management plans that affect water rights within specific hydrologic basins or other geographic regions. For example, the Utah Division of Water Rights has adopted a policy prohibiting certain POD changes within a portion of the Tooele Valley basin. A separate administrative policies database may be included in the system 101 for all such water rights agency policies and plans.

The real property database 215 stores geo-referenced vector parcel data referenced to the GIS dataset 212. The real property database 215 is configured to communicate with the search module 211 to allow a user to perform a search query based on geographic location parameters, such as a parcel number or identifier, rather than a water right.

The water rights analysis system 101 may also maintain a unique set of water rights databases 210, hydrologic basins databases 214, and real property databases 215 for each different jurisdiction. For each state, the set of databases is referred to as the "state databases."

The water rights analysis system 101 may also include a translator module 216 that translates the data stored in the system's databases for use in the methods described below. The translator module 216 allows the water rights analysis system 101 to run the same processes with only one set of instructions on all search queries for all jurisdictions. The translator module 216 allows the same front end of the system 101 to receive data from water rights agencies in multiple different jurisdictions and to deal with database schema changes. In one embodiment, because each jurisdiction and water rights agency uses its own terminology and field identifiers in its water rights agency databases 104, the translator module 216 translates the data into a common format or identifier for easier use with the front end of the water rights analysis system 101. For example, Utah's CH_STATUS field is translated to CHANGE_STATUS. Another state may have a field named TRANSFER_STATUS, which would also translate to CHANGE_STATUS so the field name is the same from the front end for all state water rights data.

In another embodiment, the translator module 216 translates data obtained from the water rights agency databases by consolidating related data into single rows in the tables. For example, water rights data maintained by a water rights agency may have a separate row for every instance that an owner or a POD is used in a water right application, thus leading to many duplicate rows and errors associated with new or updated data. The water rights analysis system 101 is structured to have one row for an owner, POD, or water right so as to eliminate the above-described problems. This is done by the translator module 216, which normalizes multiple rows in the water rights agency data into one row whenever the multiple rows are determined to be the same. For example, this may be done by matching the first name, last name, care of, address, address city, and address fields for water right owners and/or water right protesters. For PODs, the normalizing may be done by matching the POD type and geographic location of the PODs.

Additionally, the translator module 216 may also fix imported data by removing unprintable strings and control characters and translating Universal Transverse Mercator (UTM) coordinates into latitude and longitude coordinates.

In one embodiment, the water rights data is translated by the translator module 216 only when a user initiates a search. In an alternative embodiment, water rights data received from the water rights agency databases 204 is translated before it is stored in the system's water rights databases 210. Thus, the system's databases are not exact copies of the water rights agency databases 104, but instead are already in a format useable by the water rights analysis system 101 when a user search query is received. However, it should be appreciated that either arrangement may be used in the water rights analysis system 101. Maintaining the system's databases in the same format as the water rights agency databases 104, and thus translating the water rights data only when a user initiates a search query, makes updating the system databases from the water rights agency databases 104 easier and faster at the cost of slightly more processing time when a user performs a search. On the other hand, translating the data received prior to storing it in the system's databases makes updating the system's databases longer and more cumbersome, but decreases the processing time when a user performs a search. It should be understood that the system 101 may receive water rights data, hydrologic basins data, and property data from water rights agency databases, hydrologic basins databases, and real property databases at any time, and at any scheduled interval. For example, the system 101 may update all databases once a week at a time when few users are likely to be using the system 101.

The water rights analysis system 101 is also configured to detect changes to the water rights data in the water rights agency databases 210 by checking for changes in electronic or paper documents scanned and stored in the water rights agency database. Each such document is downloaded by the system 101 and hashed using any common low collision hashing algorithm to generate a fixed length string, such as a 64- or 128-character hash. The hash is stored in the water rights databases 210 in the system along with the time the document was downloaded and hashed. The next time the file is checked from the water rights agency database 104, a new hash is generated and compared with the stored hash. If the new hash is different the file has changed, in which case the system 101 saves the downloaded document in the water rights databases and may provide a notification to an administrator or to a user via an alert on the website. All previous versions of the document can be stored over time to show a full history of changes. This can be done by storing every version of the document explicitly or by storing the incremental changes or any other algorithm known to those skilled in the art.

In some examples, one or more of the modules and data storage facility shown in FIG. 2 may be implemented at least in part as computing instructions (e.g., as one or more applications) residing within data storage facility 202 or other computer-readable medium and configured to direct processing module 203 to perform and/or direct one or more other components of water rights analysis system 101 to perform one or more of the processes and/or operations described herein. In certain embodiments, for example, search module 211 may be implemented, at least in part, as computing instructions residing within data storage facility 202 and configured to direct processing module 203 to perform one or more of the processes and/or functions described herein.

An exemplary process performed by the water rights analysis system 101 is illustrated in FIG. 3 as a software program executing in the system server 102. FIG. 3 shows a high-level flowchart of one embodiment of the process that implements the functions of the water rights analysis system described above. While FIG. 3 illustrates exemplary steps according to one embodiment, other embodiments may omit, add to, reorder, and/or modify any of the steps shown in FIG. 3.

The water rights analysis system receives a search query input from a user (step 301). Based on the search query, the system defines a geographic search area (step 302), which allows the system to identify the relevant water rights data in the system databases (step 303) and return the relevant water rights data to the user device as the search results output via a user interface (step 304). Relevant water rights data includes all water rights data for water rights having one or more geo-referenced water rights data elements, such as POD or POU, that are located within the search area. The geographic search area may be refined, resized, or relocated by the user (step 305), and the search results returned to the user may also be filtered and customized by the user (step 306).

Figure 4A:
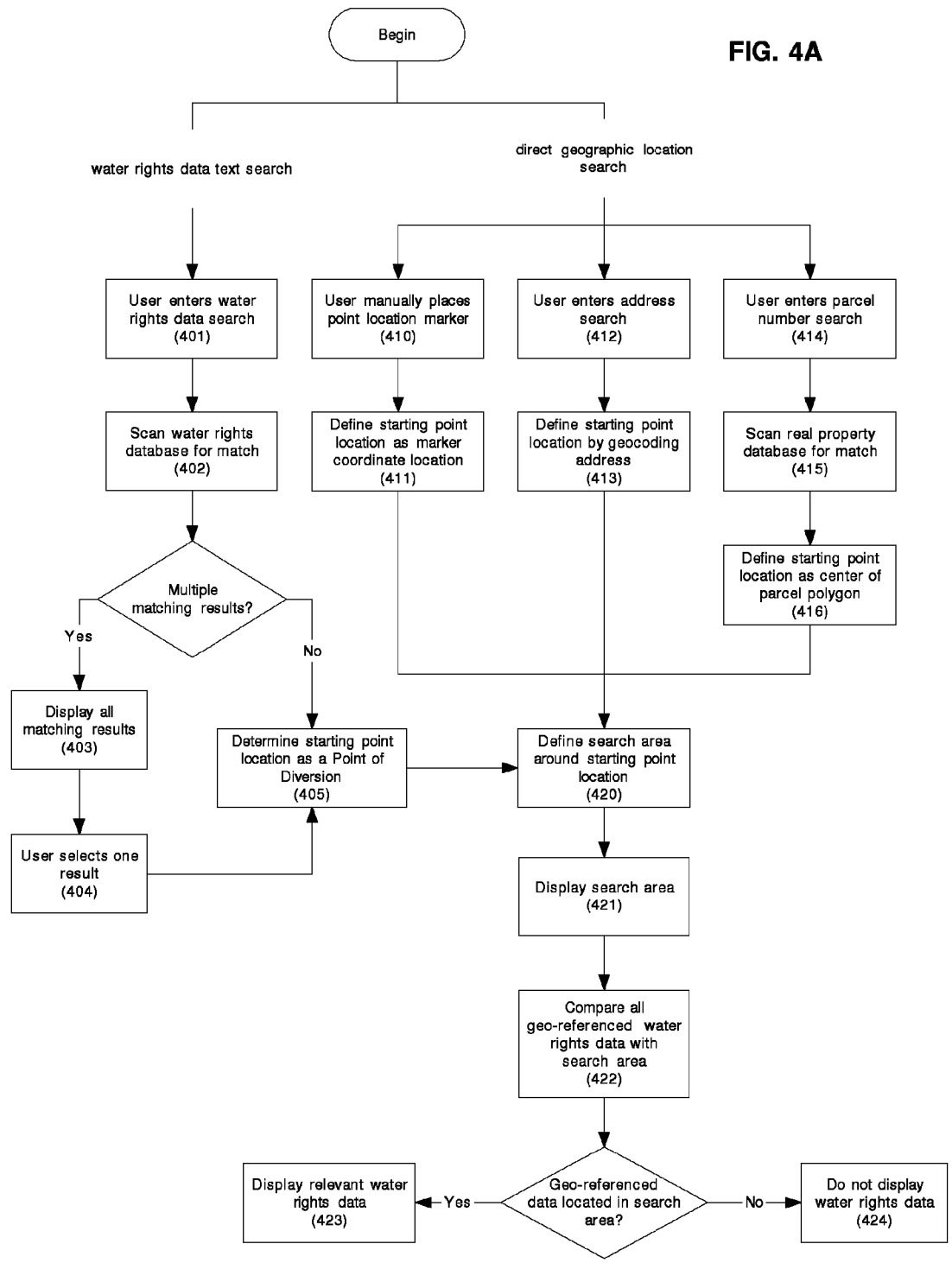
FIGS. 4A and 4B depict exemplary embodiments of flow charts of water rights analysis methods.

The search query is used to determine a geographic starting point location on the geo-reference base layer around which a search area can be defined. Referring to FIG. 4A, the search query may be received by the water rights analysis system from a user in many different forms. The search query may comprise a water rights data search created by the user entering a search term into a search box on the user interface (step 401). The search term may be any of the water rights data in the system water rights databases, such as a water right number, water right owner, or change application number. It should be appreciated that the system may be configured to allow the user to search for any of the water rights data in any of the system's databases. The system scans the water rights databases for matching data to identify the matching water right (step 402). If there are several matching results, such as if several water rights are owned by the same owner, the system displays a listing of all matching water rights (step 403) and allows the user to select the desired water right (step 404). If there is only one matching result, or if the user has selected one water right from a list of multiple results, the system then defines the geographic starting point location as any one of the PODs of the water right, as described herein (step 405).

As shown in FIG. 4A, the user may also proceed with a direct geographic location search instead of a water rights data search. In one embodiment, the system may display the geo-reference layer, such as a map or aerial photo, at the outset on the user device. In one form of a geographic location search, the user manually places a geographic point location marker on the geo-reference layer (step 410). This may be done by drag-and-drop, i.e. allowing the user to select a point location marker by clicking on the marker (with the use of a mouse or touch-pad or other user-controlled device) and dragging it onto the geo-reference layer and dropping the marker at the desired location where the user wishes to query the system for water rights data. Or, it may be done by allowing the user to point a cursor or arrow or other similar marker controlled by the user at the location on the geo-reference layer and then performing a user-controlled action to designate the location, such as clicking, double-clicking, or right selecting and selecting an option from a pop-up menu. Regardless of the method followed, the system determines the starting point location as the coordinate location of the marker (step 411). In another embodiment (not shown), the user may draw a rectangle on the geo-reference layer to define the search area.

In a further embodiment, the direct geographic search query comprises a user searching for a physical location address, county selection, or zip code (step 412). In this embodiment, the system determines a point coordinate location for the address or zip code by geocoding (step 413). Geocoding is the process of determining associated geographic point location coordinates from other information, such as street addresses or zip codes. Any type of geocoding system may be used, including those available through third parties. The use of geocoding is known to those of skill in the art, and therefore is not discussed further.

In another option, the direct geographic search query comprises a parcel number search, commenced by the user entering a property parcel number (step 414). The number is of the type assigned or maintained by a state, county, or other government entity, such as a tax parcel number, for real property parcels. The system scans the real property database to locate a matching parcel (step 415). A point location coordinate is then derived from the property data by retrieving the polygon vector data defining the parcel's boundaries and determining the geometric center of the parcel polygon (step 416). In another embodiment (not shown), the system may define a starting point location from a parcel number search by scanning the real property database to determine the physical address for the parcel number, and then determine a point location coordinate for the address as described above through the use of geocoding.

In another embodiment, the direct geographic search query comprises a search based on a township and range search, and may further include a section search within the township and range.

Figure 4B:
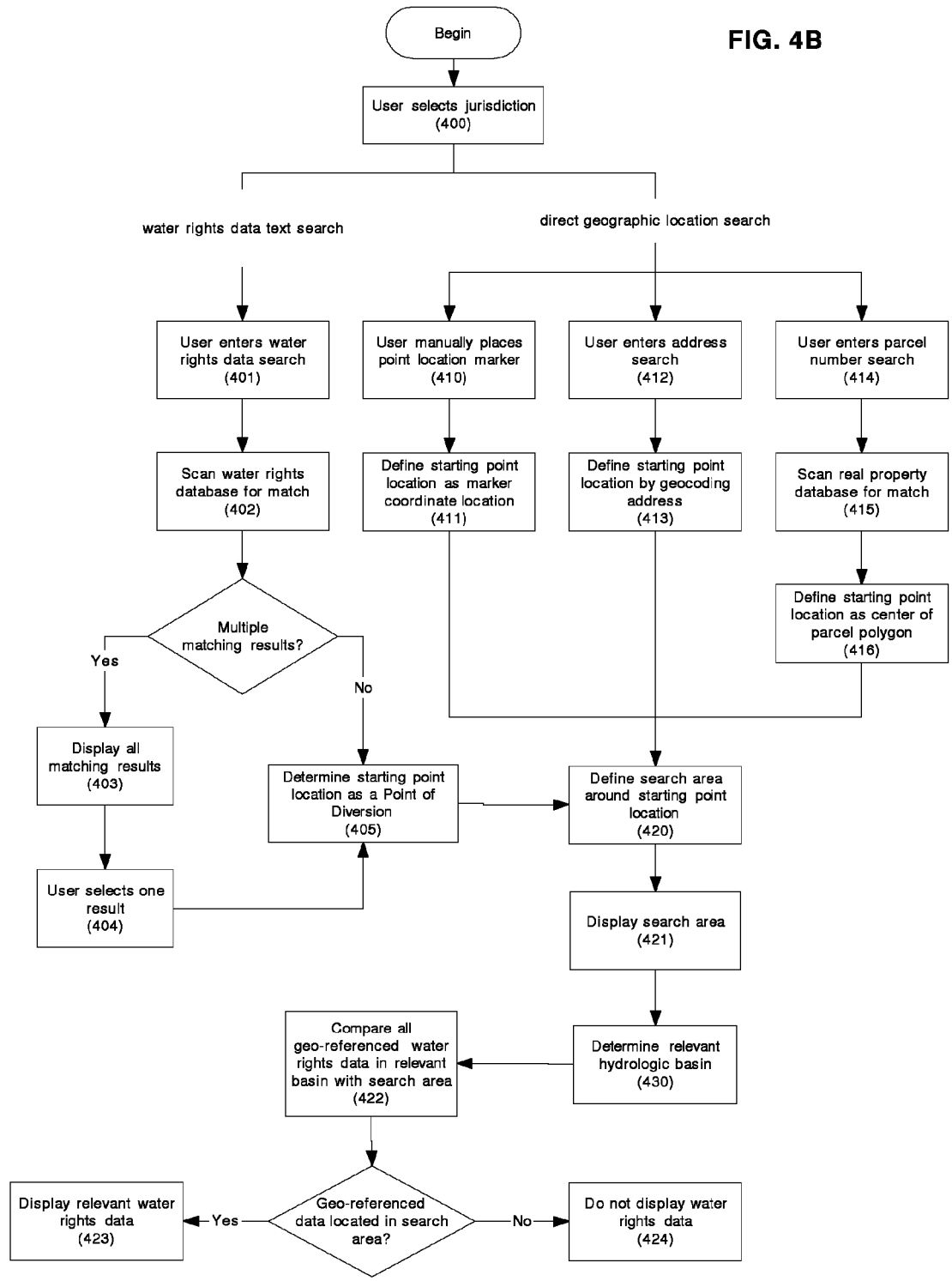

In another embodiment shown in FIG. 4B, the system may be configured to receive a user selection of the relevant jurisdiction for the user's search query (step 400). Receiving a user selection of the relevant jurisdiction allows the system to determine which system databases will be searched for the relevant water rights data to return in the search results. In one example, the system is configured to allow the user to select in which state the user will be searching.

In another embodiment (not shown), the system is configured to allow the user to specify the desired type of water rights data to search in the water rights databases and to present to the user as search results. By way of example, the system may allow the user to conduct a water creation search, current water search, change applications search, or exchange applications search. Indeed, the system may be configured to allow the user to define the type of search to be performed, and the options for such may be based on any water rights data. A water creation search directs the water rights analysis system to search and present to the user water rights data relating to the creation of water rights, such as applications to appropriate, water claims, and the like. A current water search directs the system to identify and display the current parameters of one or more water rights, without showing any historical changes (such as POD changes).

Having identified a geographic starting point location, the system defines a geographic search area around the geographic starting point location (420). The search area generally comprises a set of vector data creating a polygon layer on the geo-reference layer. The search area may be any shape, including but not limited to a circle or polygon. In another embodiment, the search area is the hydrologic basin polygon in which the geographic point location is located, as defined by the water rights agency hydrologic basin data. The search area may also be any size. The system may have a default setting for the size of the search area, and may allow the user to adjust the default setting. The geographic search area may be defined with the geographic starting point anywhere within the search area, but most preferably as the center of the search area. The system displays the search area on the geo-reference layer on the user device (step 421). The user may refine and resize the search area at any time during the process as desired by the user, making the search area larger or smaller, or altering its shape and dimensions.

In another embodiment not shown, the search area is defined as a hydrologic basin as defined in the hydrologic basins database. In this manner, a user may search all water rights within a certain hydrologic basin.

After the search area has been defined, the system identifies the relevant water rights data and presents the search results output to the user device. To identify the relevant water rights data, the system performs a point-in-polygon test on all geo-referenced water rights data, such as POD or POU, to determine if any water rights data elements are located within the search area (step 422). The point-in-polygon test may comprise any method known to those of skill in the art, such as, but not limited to, a ray casting method or angle addition. If a water rights data element is located within the search area, such as a POD, the water rights data, and other associated information, is displayed to the user as the search results (step 423). If the water rights data elements are not located within the search area for a particular water right, the water rights data is not displayed in the search results (step 424).

The system may determine relevancy based on the existence of only one water rights data element being located within the search area. For example, a water right may have all but one POD located outside of the search area, but the location of one POD within the search area will result in the water right associated with that POD being defined as relevant. The criteria for determining relevancy may be adjusted or defined differently, whether by the system default settings or by the user. For example, a user may adjust the settings such that only those water rights having all geo-referenced water rights data elements within the search area are relevant. Or, in an alternative example, relevancy is based only on the heretofore, or hereafter PODs.

In another embodiment, as shown in FIG. 4B, the system may also perform an additional step prior to defining the search area, in order to filter or narrow the list of water rights data that the system will scan to determine which water rights data is relevant to return as the search results output. This additional step comprises determining the hydrologic basin in which the search is performed (step 430). Water rights data for each water right are often tied in the system databases, directly or indirectly through correlation tables, to the hydrologic basin in which the water right's PODs are located. By determining in which hydrologic basin the search is to be performed, the system can eliminate significant amounts of water rights data to be searched in determining the relevant water rights data for the search results output. This can result in a significant decrease in processing time. The applicable hydrologic basin is determined from the search query.

If the search query is a textual water rights data search, such as a water right number or owner name, the system searches the water rights databases until it identifies and locates the water right entered by the user. The system then determines from the water rights databases and hydrologic basins databases in which hydrologic basin the water right is located. For example, if a user searches for Utah water right number 15-422, the system determines from the system water rights database that the water right is located in Utah hydrologic basin number 15. Thus, when searching for relevant water rights data for the search results in later process steps (see below), the system will only search water rights data for water rights located in hydrologic basin number 15 (step 422). Otherwise, the system would search all water rights data for all water rights in the state.

If the search query is a direct geographic search query, the point location coordinate is used to determine the relevant hydrologic basin for the water rights data search. This is done by the system performing a point-in-polygon test with the point location coordinate compared against the water rights agency-defined polygons for hydrologic basins in the system database. Each water rights agency defines unique hydrologic basins with vector data in the form of polygons. The point location coordinate is compared against all hydrologic basin polygons until the relevant basin is identified from the system database.

It should be appreciated that many other methods known to those of skill in the art, or in the spirit and scope of these teachings, may be used to determine the relevant hydrologic basin. However, it should be understood that determining the hydrologic basin is not required to implement the system. In an embodiment of the system and process, determining the relevant hydrologic basin is omitted.

Figure 5:
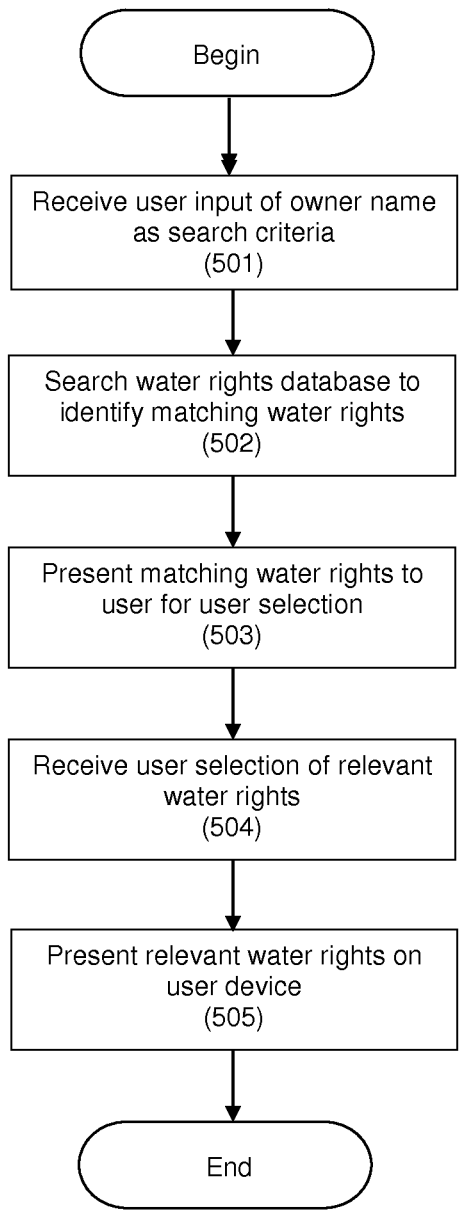
FIG. 5 depicts an exemplary embodiment of another water rights analysis method.

In another embodiment, shown in FIG. 5, the system may be configured to search for all water rights associated with a particular owner to present an "inventory" of that owner's water rights on the user device. To begin, a search query is received by the water rights analysis system (step 501). The search query may comprise all or part of an owner name, such as a last name, a first name, an entity name, and the beginning letters of a first or last name. The search query may also include additional information to further identify the owner, such as owner's address, or a "care of" (c/o) designation. The system then searches the water rights database to identify all water rights associated with the owner specified in the search query (step 502).

In one embodiment, the search accounts for spelling errors in the owner name data maintained in the water rights database, because water rights data obtained from a water rights agency often contains spelling and typographical errors. In this embodiment, every owner name in the water rights database is parsed into separate words (e.g. first name, middle name, last name, entity name) for comparison with the search query terms. The system accounts for spelling errors by comparing each of the following permutations of the search query against the parsed owner names from the water rights databases: all names having an added letter (a-z) at the beginning, an added letter at the end (a-z), a change in any one letter to a different letter (a-z), and/or a change in any second letter to a different letter (a-z). Matches are added to a list of possible search results and presented to the user for user selection (step 503). It should be appreciated that methods other than those described herein may be used to capture errors and misspellings in owner name data. The user then selects the relevant water rights, i.e. the water rights that the user desires to include in the inventory (step 504). After the relevant water rights have been selected, the system returns the search results by presenting the relevant water rights on a display associated with the user device, as described herein (step 505).

The search results from any of the searches described above may be presented to the user device in different forms. As shown in FIGS. 6-14, the search results output may comprise one or more search results layers of geo-referenced water rights data displayed on the geo-reference base layer. In these examples, the search results layers are vector data comprising graphical elements, such as points, lines, and/or polygons, representing the relevant geo-referenced water rights data elements. Any geo-referenced water rights data elements may be represented in the search results by a graphical element. In another output format, as shown in FIG. 15, the search results are presented in a fully-customizable results table or other textual listing. In another embodiment, the search results are presented in both formats.

The relevant water rights data elements represented in the geo-reference layers output may include any geo-spatially referenced water rights data elements in the system database, including but not limited to PODs, POUs, parcel boundaries, irrigation duty, crop distribution, and the like, as well as public land survey system information (e.g., township, range, and section data and boundaries). In one embodiment, the system obtains an official overlay layer from the relevant water rights agency database for display. The geo-reference layers and water rights data represented therein may be color-coded by heretofore and hereafter values if the search is a change application or exchange application search. Furthermore, each geo-reference layer of the search results can be toggled on and off by the user.

Figure 6:
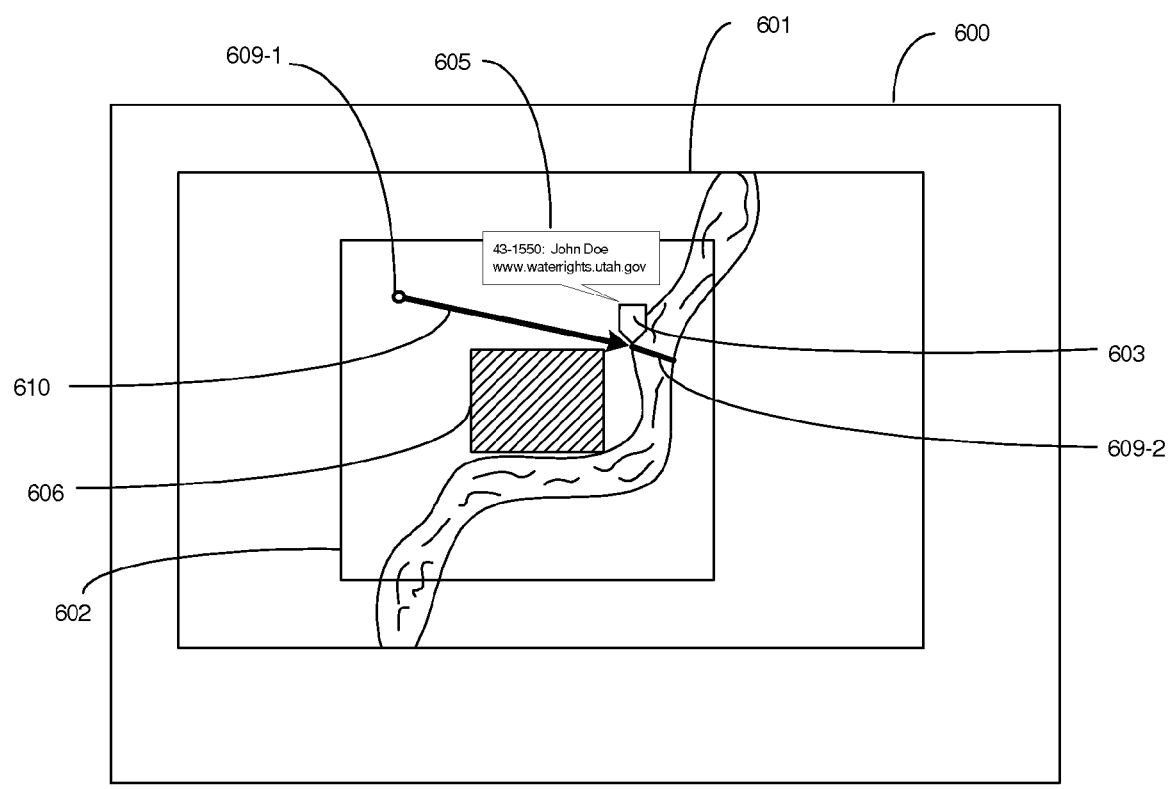
FIGS. 6-15 depict representations of a user interface according various exemplary embodiments of the water rights analysis system.

In one embodiment, as shown in FIG. 6, point locations that are located within the search area 602, such as PODs, are represented by a placemark icon 603 on the geo-reference base layer 601 on the user interface 600. The system may display a placemark icon 603 on the geo-reference base layer 601 for each POD associated with a relevant water right, or for each POD located within the search area. In another embodiment, the system displays just one placemark icon 603 for a water right having more than one POD. In this embodiment, the POD identified on the map with a placemark 603 may be determined by any means, such as randomly or in sequential order of the PODs listed in the system database, or by averaging, as described herein. In another embodiment, the user may have the option to select whether the system displays a placemark 603 for all PODs for each water right, or for only one POD for each water right. The user may also have the option of selecting the criteria to determine which POD is represented on the map by a placemark 603. The system may also be configured to display placemarks 603 for all PODs located in the search area 602 for each water right.

The POD placemark icons 603 may also be configured to display additional information about the associated water right. For example, as shown in FIG. 6, by clicking on or otherwise selecting the placemark icon 603, the system may display one or more popups, dialog boxes, or balloons 605 with water rights data and information about the water right or POD represented by the POD placemark icon 603, such as the water right number, owner, POD legal description, the priority date or filing date of the water right, and/or a hyperlink to the water right record or file on the water rights agency database. While this data is only an example, any water rights data in the system database associated with the POD or its associated water right may be displayed in the popups, dialog boxes, or balloons 605.

In another embodiment, the POUs for water rights having a POU located within the search area 602 may be represented on the geo-reference base layer. This may be shown by line or polygon vector data defining the boundaries 606 of the POU, or shading the area comprising the POU. The POU information for each water right is contained within the water rights databases.

Figure 7:
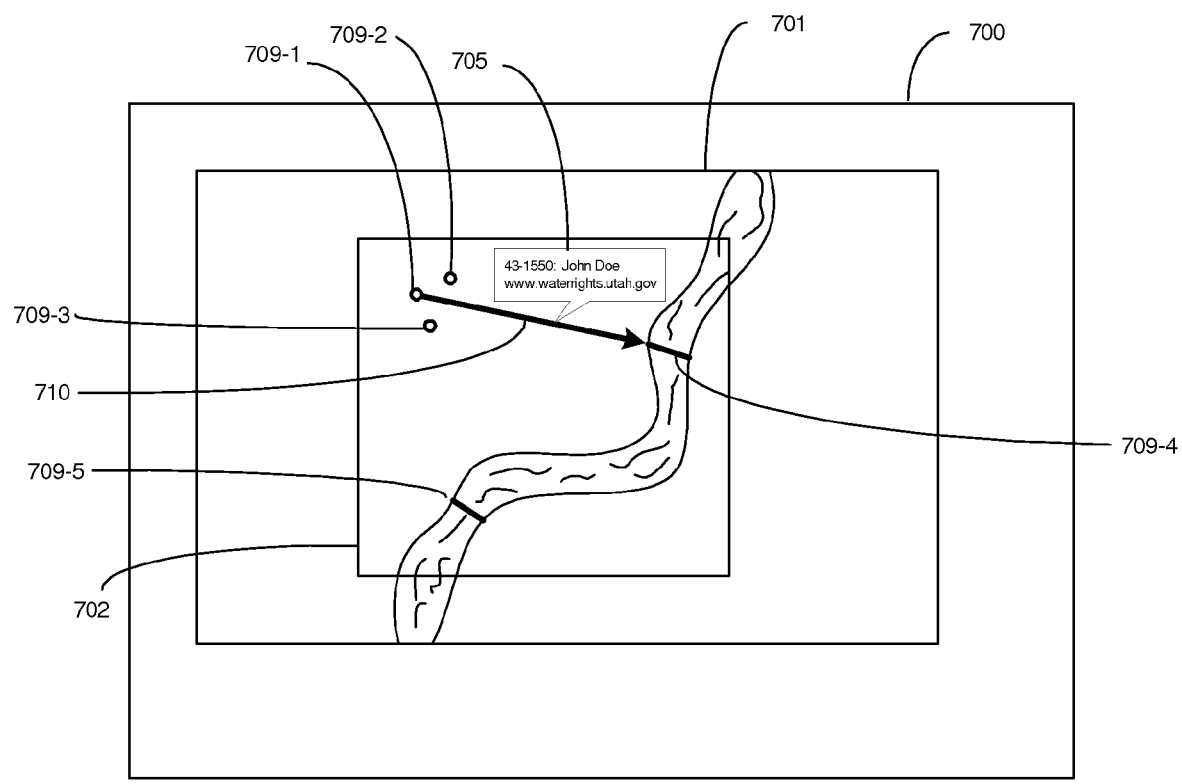

The system may also visually display POD changes for a water right, which is done by displaying a line (a "change line") 610 from a heretofore POD 609-1 to a hereafter POD 609-2 as a vector data layer on the geo-reference base layer 601. For water rights having only one heretofore and one hereafter POD, the change line 610 may be a single line between the two PODs (a "one-to-one" change), as shown in FIG. 6. But for water rights having multiple heretofore and/or hereafter PODs, the change line may take many different forms. In one embodiment, as shown in FIG. 7, the system displays, on geo-reference base layer 701 on user interface 700, a change line 710 from only one heretofore POD 709-1 to only one hereafter POD 709-4, even though there are multiple heretofore and hereafter PODs 709 (e.g., PODs 709-1 through 709-5). The heretofore and hereafter PODs 709 used for the change line 710 may be determined randomly, or they may be determined according to which PODs are located within the search area 702, or any other method. Regardless of which PODs are used, the change line 710 starts and stops on actual PODs.

Figure 8:
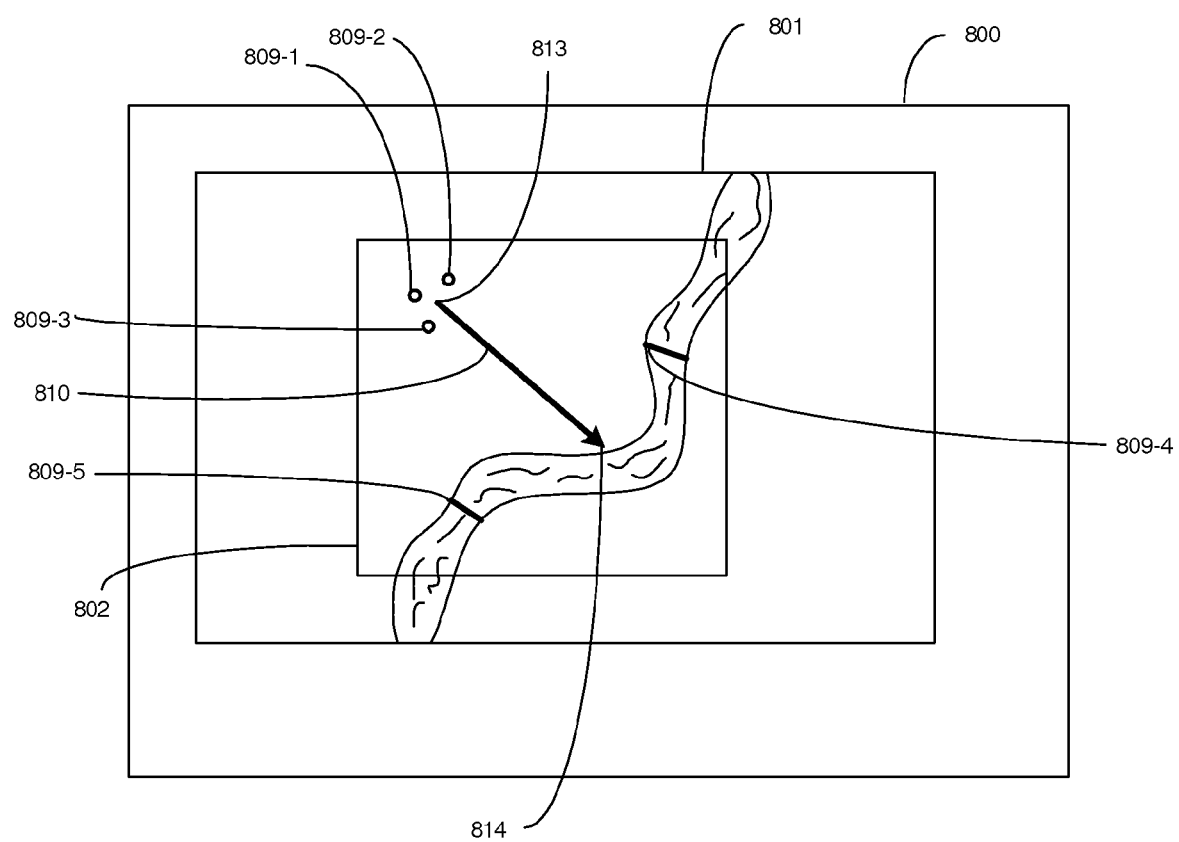
Figure 9:
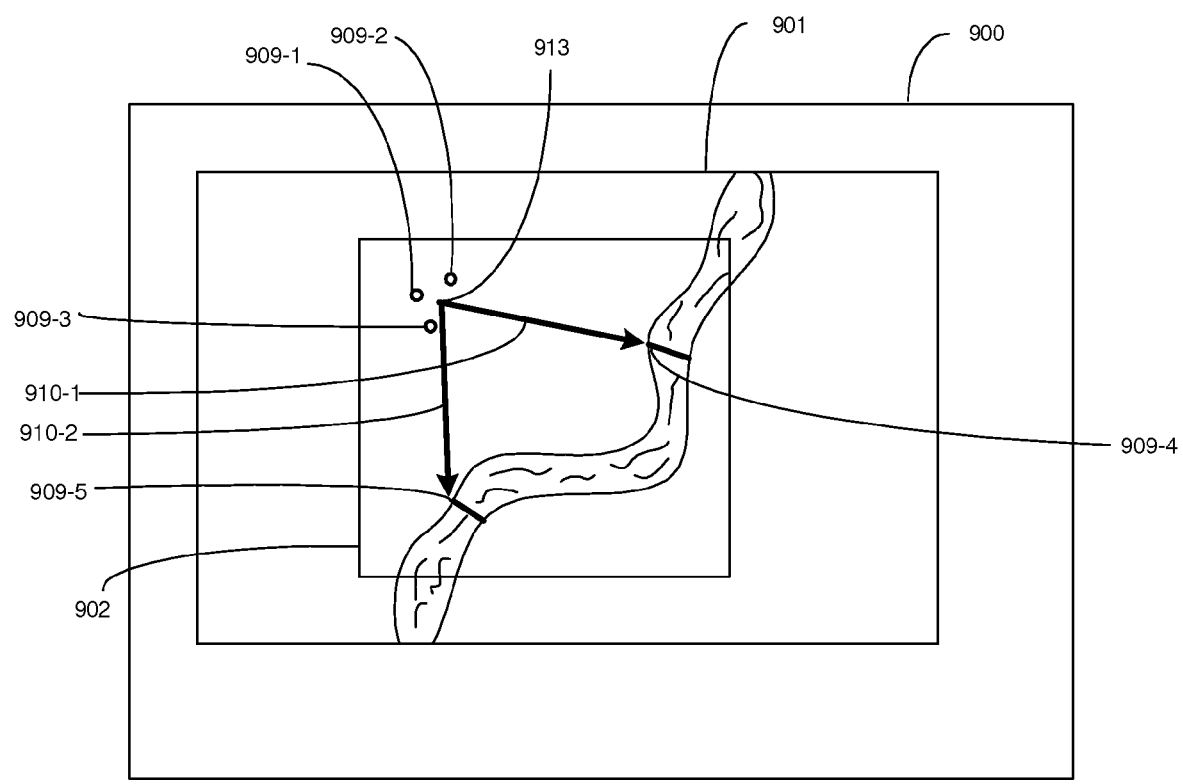
Figure 10:
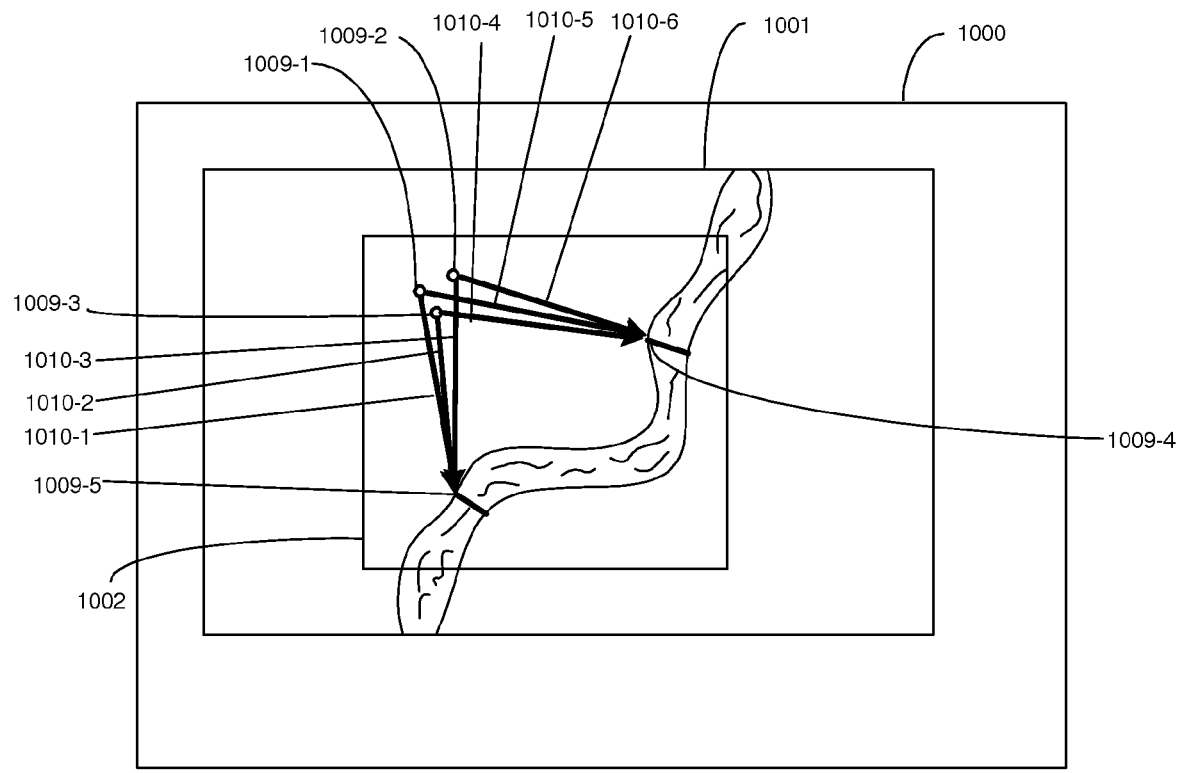
Figure 11:
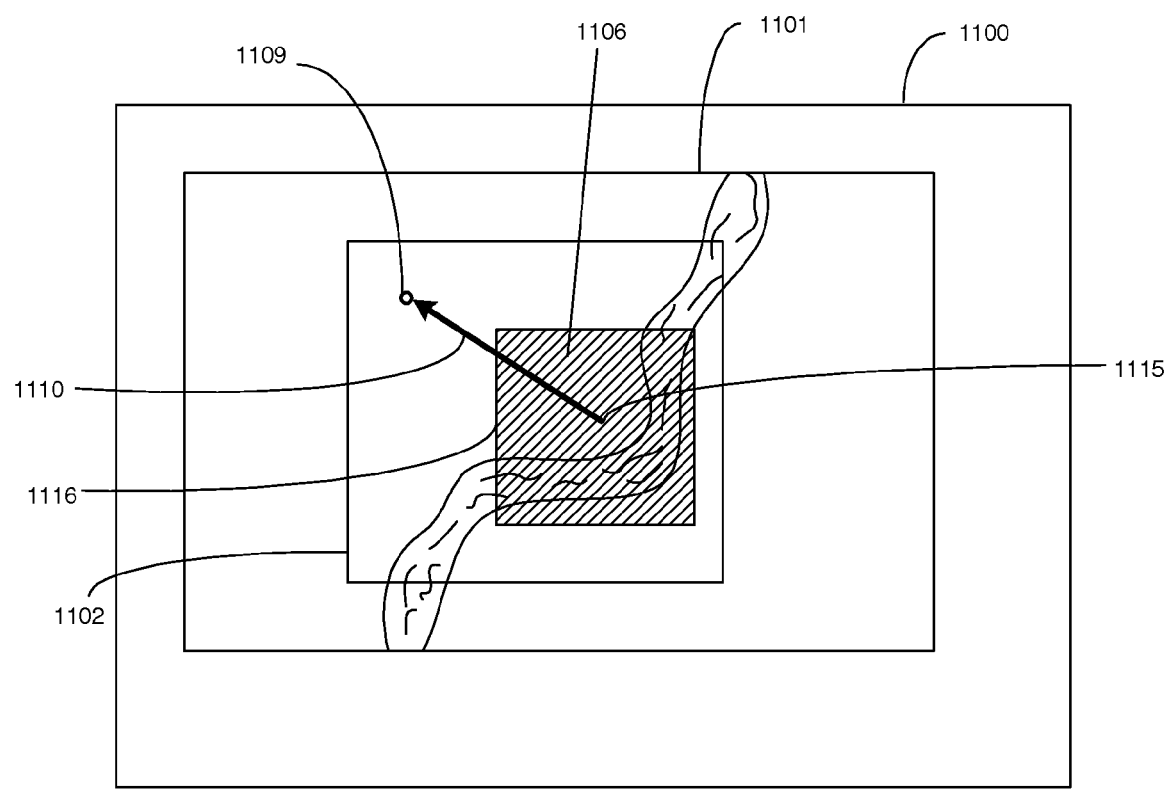
Figure 12:
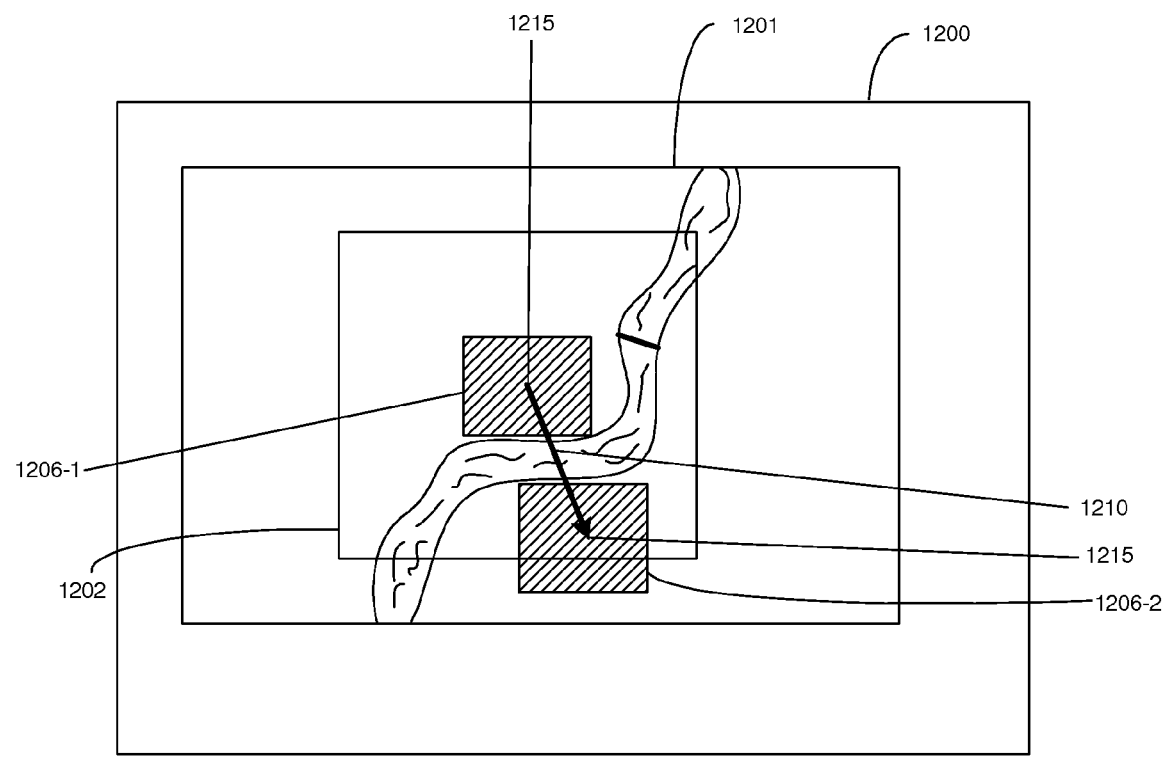
Figure 13:
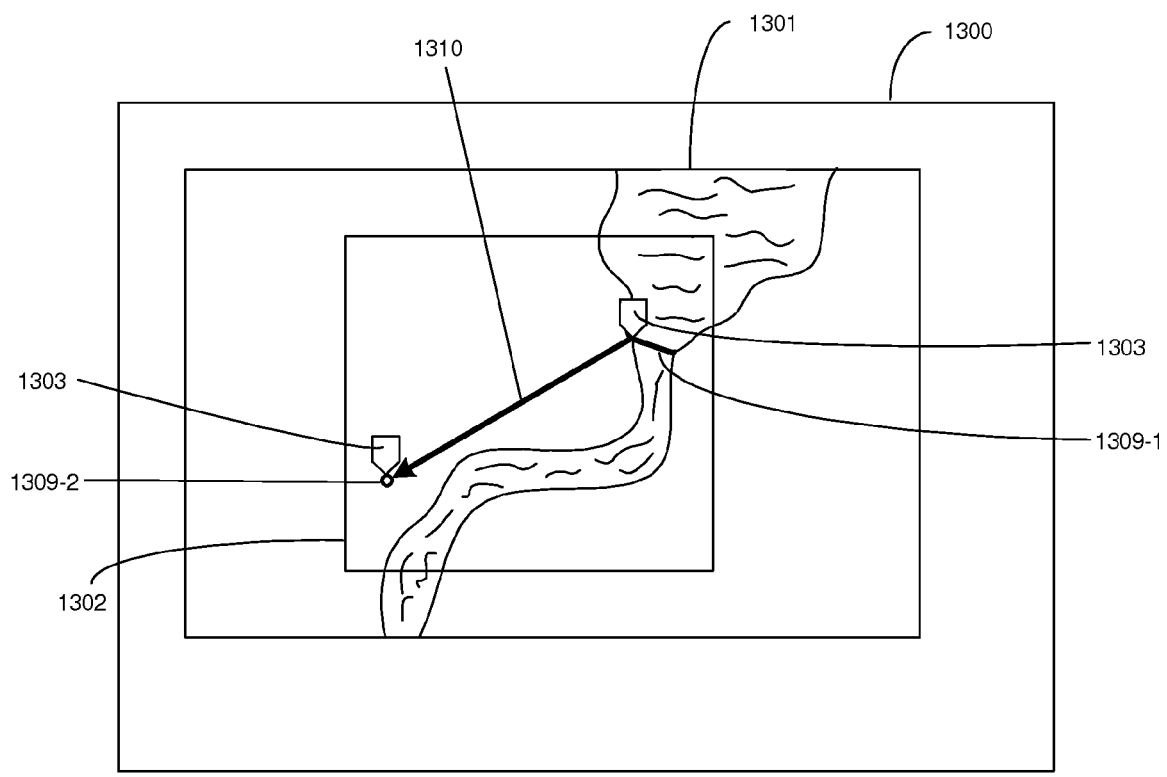

In another embodiment for displaying a POD change line, as shown in the user interface 800 depicted in FIG. 8, the system displays, in search area 802 on geo-reference base layer 801, only one change line 810 from the average heretofore POD 813 to the average hereafter POD 814. The PODs 809 (e.g. PODs 809-1 through 809-5) shown in FIG. 8 are averaged by determining the geometric center of the polygon defined by all PODs for the heretofore and the hereafter groups. This method gives the user a good approximation and overview of the POD change from a glance.

In another embodiment for displaying a POD change line, the system displays one or more change lines between heretofore and hereafter PODs determined according to an "intelligent average." To do this, the system groups the heretofore PODs into relevant subgroups and then averages them using an algorithm as follows:

1. determine the farthest distance between a heretofore POD and hereafter POD;
2. determine the "group distance" as a pre-defined fraction of farthest distance, such as 1/10 of the farthest distance;
3. group all PODs within the "group distance" from each other, creating one or more groups; and
4. determine the average of each group, as described above for averaging.

The pre-defined fraction used to determine the "group distance" may be configured at a fraction other than 1/10, or the user may define the fraction. Indeed, the fraction may be determined according to any other method known to those of skill in the art. Intelligent averaging makes a POD change to a single general area, such as a new well field, display only one change line, but a POD change going in two different directions, as shown in user interface 900 depicted in FIG. 9, might display, in search area 902 on geo-reference base layer 901, multiple change lines 910-1 and 910-2. Doing this gives a good approximation and overview of the POD change where there are multiple heretofore or hereafter PODs 909 (e.g. PODs 909-1 through 909-5) at different general locations. Using the fraction of the total distance also keeps small movements to multiple points from being grouped. In another embodiment for displaying a POD change, as shown in user interface 1000 depicted FIG. 10, the system displays, in search area 1002 on geo-reference base layer 1001, change lines 1010-1, 1010-2, 1010-3, 1010-4, 1010-5, and 1010-6 from each heretofore POD 1009-1,1009-2, and 1009-3 to each hereafter POD 1009-4 and 1009-5, referred to as "cross product."

Some water rights do not have specific point location data for PODs. For example, where a water right allows stockwatering from a stream anywhere within a 40-acre tract of land, the POD is not a single point location, but is any point along the stream within the 40-acre tract, or between two defined points on a stream (i.e. from "point-to-point"). In one embodiment, as shown in user interface 1000 depicted in FIG. 11, the system determines the center 1115 of the tract of land 1106 (located in search area 1102 on geo-reference base layer 1101) in which the point-to-point is located, often a full township/range section (640 acres), or a quarter-quarter section (40 acres), and uses such center point 1115 as the starting or ending point(s) for the change line 1110, along with POD 1109 as the other of the starting or ending point, and also displays the tract(s) of land, either with a boundary polygon 1116 or area shading or cross-hatching, or both. If the point-to-point is a single point, as is sometimes the case, then the single point is treated like a POD. In another embodiment, an entire 40-acre section, quarter-quarter section, section, or township may be shown as necessary if there is insufficient data to identify a point-to-point or center point.

The change lines may take many different forms and configurations. In one aspect, the change lines have shape identifiers at one or both ends of the change line, representing the heretofore and hereafter PODs. For example, as shown in FIG. 6, the change line 610 may be configured to terminate with an arrow at the hereafter POD 609-2. The arrow 620 also shows the direction in which the POD was moved from its original location, as well as distinguishes between the heretofore and hereafter PODs. In another embodiment, where there are multiple water rights or POD changes within the search area, the change lines, or the shape identifiers, may be color coded, such as to distinguish between different POD change applications.

In another embodiment, the change lines themselves are color coded to indicate the status of the POD changes. In one example, a green change line indicates that the POD change was approved by the water rights agency; a red change line indicates that the POD change was denied or rejected by the water rights agency; and a yellow change line indicates that the water rights agency has not made a determination yet regarding the POD change. In another aspect, there may also be several change lines stacked on top of each other, such as when there are identical POD changes. The different change lines in the stack may be distinguished in many ways, such as by color coding the lines; providing a unique shape identifier at the heretofore POD, such as a square shape when change lines are stacked, and a circle shape when there is only one change line; providing a different thickness for each change line in the stack such that the stack goes from thinnest to thickest, with the thickest at the bottom; curving the change lines into arcs of different radii; or any combination of the above. Indeed, any method known to those of skill in the art may be used to distinguish stacked lines from single change lines, and to distinguish among stacked change lines in a stack.

The change line is also configured to display additional information when the user clicks on the change line. For example, as shown in FIG. 7, by clicking or otherwise selecting change line 710, the system displays one or more popups, dialog boxes, and/or balloons 705 with additional water rights data about the POD change represented by the change line, such as the change application number, the associated water right number, the POD legal descriptions, the priority date or filing date of the change application, and/or a hyperlink to the change application or water right record or file on the water rights agency database. While this data is only an example, any data in the system database associated with the POD change application or its associated water right may be displayed in the popups, dialog boxes, and/or balloons 705.

The system may determine which change lines to display within the search area by one of three methods. In the first, only those change lines that both begin and end at PODs within the search area will be displayed. In the second, only change lines that end at PODs within the search area will be displayed. In the third, only change lines that begin at a POD within the search area will be displayed. In another embodiment, if a change line is displayed, as determined by any of the methods just described above, all other change lines and/or PODs associated with the same water right are also displayed, regardless if they satisfy the same criteria. The system is configured to allow the user to determine which method will be used to determine which change lines will be displayed in the search area. In addition, the system is configured to allow the user to determine how the POD changes are displayed, i.e. one-to-one, averaged, intelligent averaged, or cross product, as described above.

The system is also configured to allow the user to selectively remove or hide any of the water rights data displayed in the search results on the geo-reference layer. This may be done, for example, by clicking or otherwise selecting a change line or POD icon to initiate the popup box, and then selecting an option to remove or hide the change line or POD icon, or simply clicking on the change line or POD icon. In this way, the user can remove or filter through and remove or hide water rights data that is of little interest to his or her search. In one embodiment, a user may remove all water rights data associated with a water right or change application, or only individual representations of the water right data, such as an individual change line or POD.

As described above, the search results may include any geo-referenced water rights data, such as PODs, and POD changes. In another example of displaying geo-referenced water rights data, the system may also display POU changes in the same manner described above for POD changes. POU changes may be identified by a line between the heretofore and hereafter POUs. For example, as shown in user interface 1200 depicted in FIG. 12, the change line 1210, displayed in search area 1202 on geo-reference base layer 1201, may originate and terminate either at a point location within the heretofore POU 1206-1 and hereafter POU 1206-2, respectively, such as a point at the geometric center 1215 of the POUs 1206-1 and 1206-2, or at a point location on the heretofore POU polygon boundary. However, it should be understood that the foregoing is only an example, and other configurations than those described herein may be used to display a POU change.

A water right exchange is another example of geo-referenced water rights data that may be shown in the search results similar to POD icons, POD changes, and POU changes. A water right exchange involves releasing water into a water body (lake, river, reservoir, canal, ditch, etc.) at a POD (or point of release) in order to allow the water user to take a like quantity of water at a point of exchange. As shown in the user interface 1300 depicted in FIG. 13, the system may display both the POD (or the point of release) 1309-1 and the point of exchange 1309-2 as point locations on the geo-reference base layer 1301, such as with a placemark icon 1303. The system also displays an exchange line 1310 connecting the POD (or point of release) 1309-1 and the point of exchange 1309-2. The exchange line 1310 may be a straight line (as shown), or it may be a series of lines (not shown) that follows the path or course of the water body into which the water is released, and from thence to the point of exchange. The system may also display any of the water right data for the underlying water right for the exchange. The water right exchanges displayed in the search area may include any exchange having either a point of release or a point of exchange in the search area 1302, or both. As with POD changes, the system is configured to allow the user to select which water right exchanges are displayed in the search area 1302.

When a user has performed a current water search to view the current parameters of water rights within the search area, the system displays and presents only the current parameters, such as the current PODs, POUs, and types of use, as described herein. To do this, the system identifies as relevant water rights only those water rights that have a "valid" status from the water rights agency. "Valid" means that the water right still exists, and is evidenced by water rights data related to status or the basis of the water right, such as but not limited to certificated, approved, decreed, water users claim, underground water users claim, etc. Invalid statuses, by way of example, include but are not limited to expired, lapsed, forfeited, destroyed, renumbered, withdrawn, and unapproved. For water rights that are valid, the current parameters are determined by first identifying the parameters of the original water creation document or application. In jurisdictions in which changes to the parameters (e.g. changes in PODs, POUs, etc.) are incremental, each subsequent application modifies and builds on the immediately prior application, and the changes can simply be added in order of decision date until the current result is obtained. In jurisdictions in which changes are not incremental, such as Utah, the current parameters are determined from the most recent (by decision date) application that is approved and valid. In one embodiment, the current parameters are determined when a user performs a current water search. In another embodiment, the current parameters are determined each time the water rights analysis system obtains water rights data from the water rights agency database, and stores the current parameters in the system's water rights database.

Figure 14:
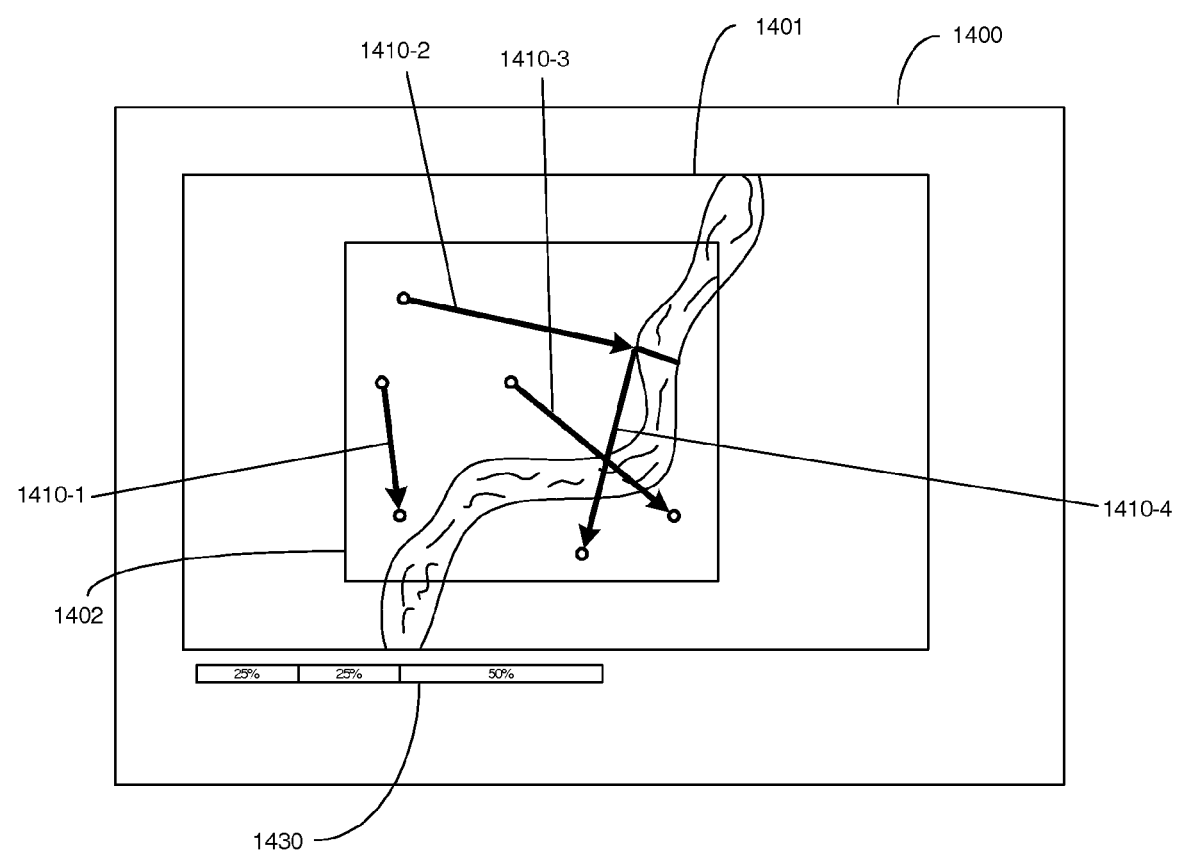
Figure 15:
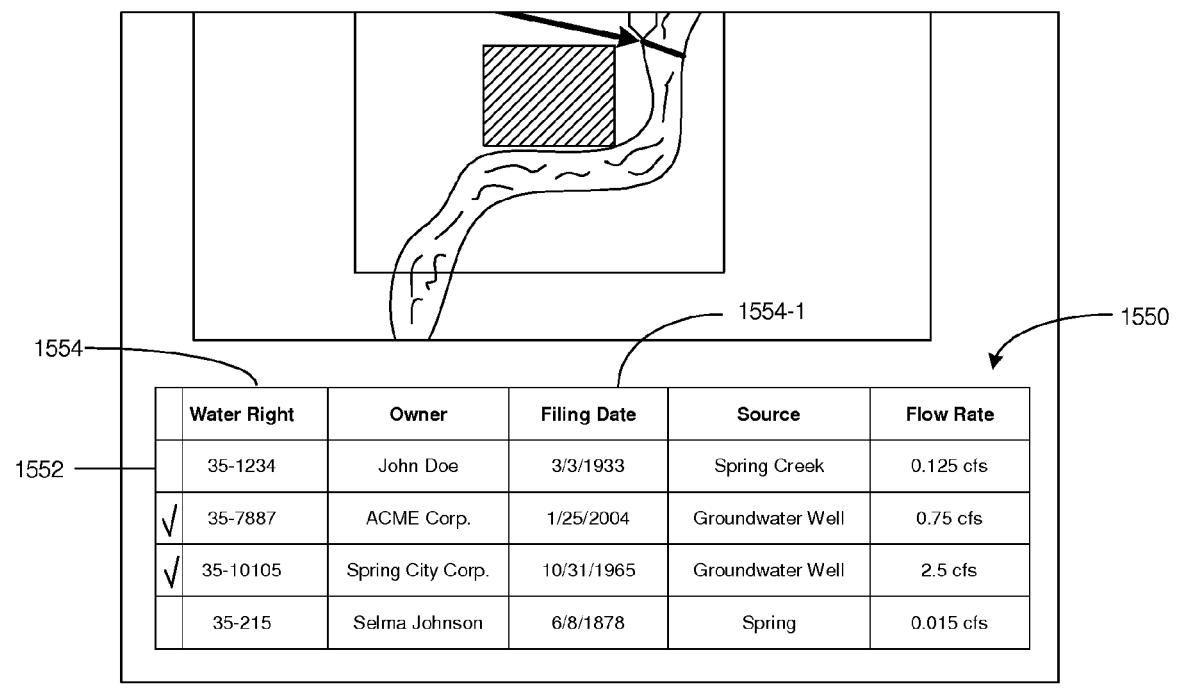

In another embodiment, as shown in user interface 1400 depicted in FIG. 14, a total status bar 1430 is provided on the user's display, showing the percentage of all POD changes displayed in the search area 1402 that were approved, rejected, not yet determined, or other (lapsed, withdrawn, etc.). The status bar 1430 represents the overall status of the change applications represented by change lines 1410 (e.g., change lines 1410-1 through 1410-4) displayed in the search area. Thus, as a user selectively removes or hides change lines 1410 from view on geo-reference base layer 1401, the status bar 1430 changes accordingly. The status bar 1430 provides the unique benefit of giving the user a quick overview of the overall approval rate of all change applications within a given geographic area. The user may use this to determine the likelihood that a new change application within the same area would be approved by the water rights agency. Without the use of this system and tool, a user would have to spend countless hours manually researching and identifying all change applications within the area and manually determining their relevance to the desired search.

A water right's history may also be displayed in the search results geo-reference layer. In one embodiment, a list of all applications related to a water right (such as an application to appropriate, all change applications, segregation applications, exchange applications, and the like) may be displayed, as described herein. The applications may be ordered by filing date, priority date, or decision date. The listed applications may be selected by the user to display the water rights data associated with the selected application in the search results geo-reference layer. The water rights data displayed may be color coded based on the selected application, so as to distinguish the water rights data in the search results geo-reference layer when two or more applications have been selected.

In another embodiment, the water right's history may be displayed in the geo-reference layer according to a time slider. A user may drag a button on the time slider until it snaps into place at various positions along the slider, each position representing a related application on the date of the application (filing date, priority date, decision date, etc.). For example, in one embodiment, when the button on the slider is at the far right of the slider, the water rights data displayed in the geo-reference layer is the current water rights data. The slider may be moved by the user to the left to snap to a position (date) representing the date of an application related with the water right, such as the date a change application was filed. At that position, the water rights data displayed on the geo-reference layer is the heretofore and hereafter water rights data associated with the application. The system may be configured to display just the water rights data for the application selected by the time slider, or it may display all water rights data for all related applications with the selected application emphasized such as by color coding, size of display elements, or top layer positioning.

It should be understood that the geo-referenced display of water rights data as described herein may also include different combinations and variations of the different embodiments and forms described herein, and that all such combinations and variations are within the scope of the implementation and operation of the water rights analysis system and method. In addition, the water rights data displayed in the search results on the geo-reference base layer is not limited to that data described herein, such as PODs, POD changes, POU changes, and exchange applications, such being merely exemplary, but may be any geo-referenced water rights data.

FIG. 15 shows another form of displaying the search results. In this embodiment, the relevant water rights data is displayed in a non-geo-referenced format, such as a results table 1550. The relevant water rights data displayed in this embodiment is the water rights data associated with the water rights determined to be relevant by the process described above for the geo-referenced search results. In one embodiment, the search results are displayed in the table in a row and column format, with the water right data for each individual water right in one row. The water rights data comprising the separate columns may be any water rights data available in the water rights databases, or derived therefrom, including, but not limited to, the water right number, owner name, status, priority date, number PODs (both heretofore and hereafter), POU, address, parcel number, nature of use, direction of a POD or POU change.

The user may customize the results table 1550 in different ways. In one embodiment, the user may add and remove columns 1554 in the table, in order to select the desired water rights data shown for each water right. In another embodiment, the user may sort the columns 1554 to list the water rights in some type of sequential order. For example, the user may sort the table 1550 based on the application filing date column 1554-1, which would display the rows 1552 of water rights in sequential order based on filing date.

In another embodiment, the user may customize the search results, both in the results table and in the geo-reference search results, by applying filters to limit or narrow the range of water rights data and water rights deemed relevant. The search results may include a set of filters with buttons or boxes that may be selected to apply the filter. For example, the system may include filters for application decision status; the age of a decision on an application (e.g. decisions less than 1 year, decisions within last 5 years, etc.); the nature of the heretofore and/or hereafter use of water; perfected water rights; type of change application (permanent, temporary, amendatory, etc.); quantity of the water right change (in volume or flow rate); number of protests; extension applications, non-use application, forfeiture or pending forfeiture, current adjudication, current litigation, and the like. Selecting and applying filters will remove or hide water rights data that does not meet the filter criteria from the geo-reference layer search results. However, water rights data that does not meet the filter criteria is not deleted from the results table, but instead may be "unchecked," indicating that the water right does not satisfy all criteria. In this way, the user may fully customize the water rights search to identify and pinpoint the data and information that is most relevant and useful to the user. The customizable search results allows the system to display water rights data for water rights that share similar attributes to an existing or proposed water right to be analyzed by the user. Such attributes may include geographic location and details such as distance, PODs, use types, directions of changes, and the like.

In another embodiment, the user may customize the water rights data displayed on the geo-reference base layer in two different ways. In the first, as explained above, the user may click on the geo-referenced data, such as POD icon and change line, to remove it or hide it from the geo-reference display, which will also uncheck it in the table search results. In the second, the user may uncheck the water rights data in the table, which will have the effect of removing or hiding the geo-referenced water rights data from the geo-reference base layer.

The system is also configured to allow the user to reconfigure the search area as well as arrange and filter the search results table output at any time after search results have been displayed to the user. In this way the user can customize and refine the search and search results to achieve the desired information relevant to the user's problem.

For each search performed by a user, the system may also be configured to save the user's search in the system database, such as filters applied, the search area size and location, the display types, columns selected, water rights displayed or checked, to allow the user to retrieve the information or return to the same place during a later session. The system is also configured to allow the user to deliver the search results to other output devices, such as to a printer, or to another device via a network connection, or in a different format, such as PDF, spreadsheet, HTML, and the like. In one embodiment, the user may print the visual search results, the table search output, or both. In another embodiment, the user may email the visual search results, the table search results output, or both.

The water rights analysis system and methods described herein provides a unique and powerful tool for analyzing water rights that otherwise is not available with prior art systems. Displaying interactive change lines provides a new way of visualizing change applications, and physically shows what is happening with a change. Because the system is capable of displaying all change lines within a selected search area, the interactive system shows physical water rights changes and trends. For example, it shows the direction in which water rights are being moved, as well as the approval rate for water rights. A wealth of information is now available to a user through this system in just a few seconds, whereas a user would have had to spend hours combing through individual water rights records to identify trends in POD change directions, locations, and approvals.

In addition, the water rights analysis system provides an actual interactive access portal to water rights information at a water rights agency desired by a user. For example, if a water user wishes to locate all Utah state engineer orders denying change applications within a certain geographic region of the state, a user may now access that data in a manner of seconds. By using the system, the user may view all denied change applications within that desired region, and then follow the hyperlinks directly to the Utah state engineer records, including orders and records of decisions, for those water rights. Without the benefit of this water rights system, obtaining such information would be akin to finding the needle in a haystack.

The system is more robust than current water rights agency databases because it allows the user to create the results the user desires based on the filters applied, and obtain all relevant information without a complicated, time-consuming search. It may be said that the system operates as a water rights "search engine" by allowing the user to obtain all relevant water rights records and information in a matter of seconds. Such is not possible with current systems. The geo-reference layer, which is a map or aerial photo, and table allow the user to identify trends in water rights administration and use that information in water management and planning.

What is claimed is:

1. A method comprising:
    maintaining, by a water rights analysis system, a water rights database comprising water rights data representative of one or more water rights administered by a water rights agency;
    providing, by the water rights analysis system for display by a user device, a graphical user interface including an interactive geo-reference base layer;
    receiving, by the water rights analysis system from the user device, a search query defined by user input provided by a user of the user device;
    identifying, based on the search query, a geographic search area;
    searching, by the water rights analysis system, the water rights database to identify relevant water rights data, the relevant water rights data comprising water rights data for water rights having one or more geo-referenced water rights data elements located within the geographic search area; and
    providing, by the water rights analysis system for display by the user device on the geo-reference base layer, one or more graphical elements representing at least a subset of the relevant water rights data,
    wherein the one or more graphical elements comprises at least one of a change line representing a change in a point of diversion, a change line representing a change in a place of use, and an exchange line representing a water right exchange.

2. The method of claim 1, further comprising:
    searching, by the water rights analysis system in response to the receiving of the search query, the water rights database to identify at least one match to the search query;
    determining, by the water rights analysis system, a geographic starting point location based on the at least one match to the search query; and
    defining, by the water rights analysis system, the geographic search area based on the geographic starting point location.

3. The method of claim 1, wherein
    the search query comprises a water rights data search query or a geographic search query.

4. The method of claim 1, wherein
    the search query comprises a water rights data search query, and
    the user input provided by the user comprises at least one of an owner name, a hydrologic basin, and a water right reference number.

5. The method of claim 1, wherein
    the search query comprises a geographic search query, and
    the user input provided by the user comprises at least one of a user placement of an address, a real property parcel number, a public land survey location, a county, and a zip code.

6. The method of claim 2, wherein the searching the water rights database to identify the relevant water rights data comprises searching the water rights data associated with a hydrologic basin in which the geographic starting point location is located.

7. The method of claim 1, further comprising:
    providing, by the water rights analysis system in the graphical user interface, one or more user selectable filters, the one or more user selectable filters including filter criteria corresponding to water rights data.

8. The method of claim 7, further comprising:
    receiving, by the water rights analysis system from the user device, a user selection of at least one of the one or more filters; and
    updating, by the water rights analysis system, the relevant water rights data to exclude water rights data that does not satisfy the at least one of the one or more filters.

9. The method of claim 1, embodied as computer-executable instructions on at least one non-transitory computer-readable medium.

10. The method of claim 1, wherein
    the search query comprises a geographic search query, and
    the user input is provided by the user by way of the interactive geo-reference base layer.

11. The method of claim 10, wherein the user input provided by the user by way of the interactive geo-reference base layer comprises at least one of a user drawing of the search area, a user selection of a real property parcel, and a user selection of a hydrologic basin.

12. The method of claim 1, wherein the water rights database further comprises real property data representative of one or more real property parcels.

13. The method of claim 1, further comprising:
    providing, by the water rights analysis system for display on the graphical user interface, a status bar indicating a relative comparison of approved and rejected change applications represented by a change line on the interactive geo-reference base layer.

14. The method of claim 1, wherein any one or more of the change line representing the change in the point of diversion, the change line representing the change in the place of use, and the exchange line representing the water right exchange includes an end shape identifier.

15. The method of claim 1, wherein:
    the one or more graphical elements includes the change line representing the change in the point of diversion;
    a starting endpoint of the change line representing the change in the point of diversion is located at one of a heretofore point of diversion of a relevant water right included in the one or more relevant water rights, an average of heretofore points of diversion of a relevant water right having multiple heretofore points of diversion, and an intelligent average of the heretofore points of diversion of the relevant water right having multiple heretofore points of diversion; and
    a terminal endpoint of the change line representing the change in the point of diversion is located at one of a hereafter point of diversion of the relevant water right, an average of hereafter points of diversion of a relevant water right having multiple hereafter points of diversion, and an intelligent average of the hereafter points of diversion of the relevant water right having multiple hereafter points of diversion.

16. The method of claim 1, wherein the one or more graphical elements are configured to be selectively removed from the geo-reference base layer by the user of the user device.

17. The method of claim 1, further comprising:
receiving, by the water rights analysis system by way of the interactive geo-reference base layer, a user selection of one of the one or more graphical elements; and
providing, by the water rights analysis system for display on the interactive geo-reference base layer, additional water rights data associated with a relevant water right represented by the selected graphical element.

18. The method of claim 1, wherein the geo-reference base layer comprises a map, a satellite image, or an aerial image.

19. The method of claim 1, further comprising:
providing, by the water rights analysis system for display by the user device in the graphical user interface, a results table including one or more water rights data elements associated with the relevant water rights, wherein the results table is customizable by the user of the user device.

20. A method comprising:
providing, by a user device for display on a display device associated with the user device, a graphical user interface including an interactive geo-reference base layer;
receiving, by the user device, user input defining a search query;
transmitting, by the user device, the search query to a water rights analysis system for identification of a geographic search area; and
providing, by the user device for display on the interactive geo-reference base layer, the geographic search area and one or more graphical elements representing relevant water rights data,
wherein
the relevant water rights data comprises water rights data for water rights having at least one geo-referenced water rights data element located within the geographic search area, and
the one or more graphical elements comprises at least one of a change line representing a change in a point of diversion, a change line representing a change in a place of use, and an exchange line representing a water right exchange.

21. The method of claim 20, wherein
the one or more graphical elements comprises the change line representing the change in the point of diversion, and
the change line representing the change in the point of diversion is based on a one-to-one change, an average of heretofore and hereafter points of diversion, an intelligent average of multiple heretofore and hereafter points of diversion, or a cross product of the multiple heretofore and hereafter points of diversion.

22. The method of claim 20, further comprising:
displaying, by the user device on the graphical user interface, a status bar indicating a relative comparison of approved and rejected change applications represented by a change line on the interactive geo-reference base layer.

23. The method of claim 20, further comprising:
displaying, by the user device on the graphical user interface, one or more filters for selective application by the user, the one or more filters including filter criteria corresponding to water rights data;
receiving, by the user device by way of the graphical user interface, a user selection of at least one of the one or more filters; and
transmitting, by the user device to the water rights analysis system, data representative of the at least one of the one or more filters selected by the user,
wherein the relevant water rights include one or more water rights that satisfy the at least one of the one or more filters.

24. A water rights analysis system comprising:
a water rights database comprising water rights data representative of water rights administered by a water rights agency;
a GIS dataset that correlates to geo-referenced water rights data in the water rights database;
a search module configured to receive a search query from a user device and search the water rights database to identify one or more relevant water rights; and
a display module configured to display one or more graphical elements representing one or more geo-referenced water rights data elements of the one or more relevant water rights,
wherein the one or more graphical elements comprises at least one of a change line representing a change in a point of diversion, a change line representing a change in a place of use, and an exchange line representing a water right exchange.

25. A method comprising:
maintaining, by a water rights analysis system, a water rights database comprising water rights data representative of one or more water rights administered by a water rights agency;
receiving, by the water rights analysis system from a user device, user input to define a search query, the user input specifying an owner name or a real property parcel;
searching, by the water rights analysis system, the water rights database to identify relevant water rights data, wherein the relevant water rights data comprises water rights data corresponding to the owner name or the real property parcel; and
presenting, by the water rights analysis system for display on the user device, one or more graphical elements representing one or more geo-referenced water rights data elements of the relevant water rights data,
wherein the one or more graphical elements comprises at least one of a change line representing a change in a point of diversion, a change line representing a change in a place of use, and an exchange line representing a water right exchange.

* * * * *